United States Patent
Yamauchi et al.

(10) Patent No.: US 10,481,358 B2
(45) Date of Patent: Nov. 19, 2019

(54) TERMINATION UNIT

(71) Applicant: SUMITOMO ELECTRIC INDUSTRIES, LTD., Osaka-shi, Osaka (JP)

(72) Inventors: Takayasu Yamauchi, Osaka (JP); Tomohiko Ueda, Osaka (JP); Takayuki Yokochi, Komaki (JP); Masanori Yamanaka, Komaki (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/106,401

(22) Filed: Aug. 21, 2018

(65) Prior Publication Data

US 2019/0064465 A1    Feb. 28, 2019

(30) Foreign Application Priority Data

Aug. 23, 2017  (JP) ................................ 2017-160314

(51) Int. Cl.
*G02B 6/44*     (2006.01)

(52) U.S. Cl.
CPC .......... *G02B 6/4454* (2013.01); *G02B 6/4452* (2013.01)

(58) Field of Classification Search
CPC .. G02B 6/4454; G02B 6/4452; G02B 6/4439; G02B 6/444; G02B 6/4441; G02B 6/4442; G02B 6/4445; G02B 6/4446; G02B 6/4447; G02B 6/445; G02B 6/4451; G02B 6/4453; G02B 6/4455
See application file for complete search history.

(56) References Cited

U.S. PATENT DOCUMENTS

2011/0013875 A1*  1/2011  Bran de Leon ........ G02B 6/445
                                                             385/135

FOREIGN PATENT DOCUMENTS

JP        2003-215357 A    7/2003

* cited by examiner

*Primary Examiner* — John Bedtelyon
(74) *Attorney, Agent, or Firm* — Drinker Biddle & Reath LLP

(57) ABSTRACT

A termination unit to be located on a rack part of an optical fiber rack includes a housing, a plurality of first optical fibers located in the housing and fusion spliced to a multi fiber cable introduced from an outside of the optical fiber rack, a plurality of external connection adapters located in a line in a first direction, and in which the plurality of first optical fibers are respectively connected to the plurality of external connection adaptors on an inside of the housing, a guide part located on one side surface of the housing crossing the first direction, and extending in a second direction crossing the first direction, and a fixing member attached to the one side surface of the housing, and to which the multi fiber cable is fixed. The fixing member is movably attached along the guide part.

7 Claims, 16 Drawing Sheets

TERMINATION UNIT

CROSS-REFERENCE TO RELATED APPLICATION

This application claims the benefit of priority of Japanese Patent Application No. 2017-160314, filed Aug. 23, 2017, the entire contents of which are incorporated herein by reference.

TECHNICAL FIELD

The present disclosure relates to a termination unit.

BACKGROUND

For example, Japanese Unexamined Patent Publication No. 2003-215357 has proposed an optical wiring board including a line side rack body and a device side rack body each of which has termination units in multiple stages. An optical fiber cord on the line side is introduced into each of a plurality of termination units provided in the line side rack body. In the line side rack body, the optical fiber cord introduced into the lower side termination unit is closer to the device side rack body.

SUMMARY

A termination unit according to one aspect of the present disclosure is a termination unit to be located on a rack part of an optical fiber rack. The termination unit includes a housing, a plurality of first optical fibers located in the housing and fusion spliced to a multi fiber cable introduced from an outside of the optical fiber rack, a plurality of external connection adapters located in a line in a first direction, the plurality of first optical fibers being respectively connected to the plurality of external connection adaptors on an inside of the housing, a guide part located on one side surface of the housing and extending in a second direction crossing the first direction, the one side surface extending to cross the first direction, and a fixing member attached to the one side surface of the housing, the multi fiber cable being fixed thereto. The fixing member is movably attached along the guide part.

BRIEF DESCRIPTION OF THE DRAWINGS

The foregoing and other purposes, aspects and advantages will be better understood from the following detailed description of embodiments of the disclosure with reference to the drawings, in which.

DETAILED DESCRIPTION

Figure 1:
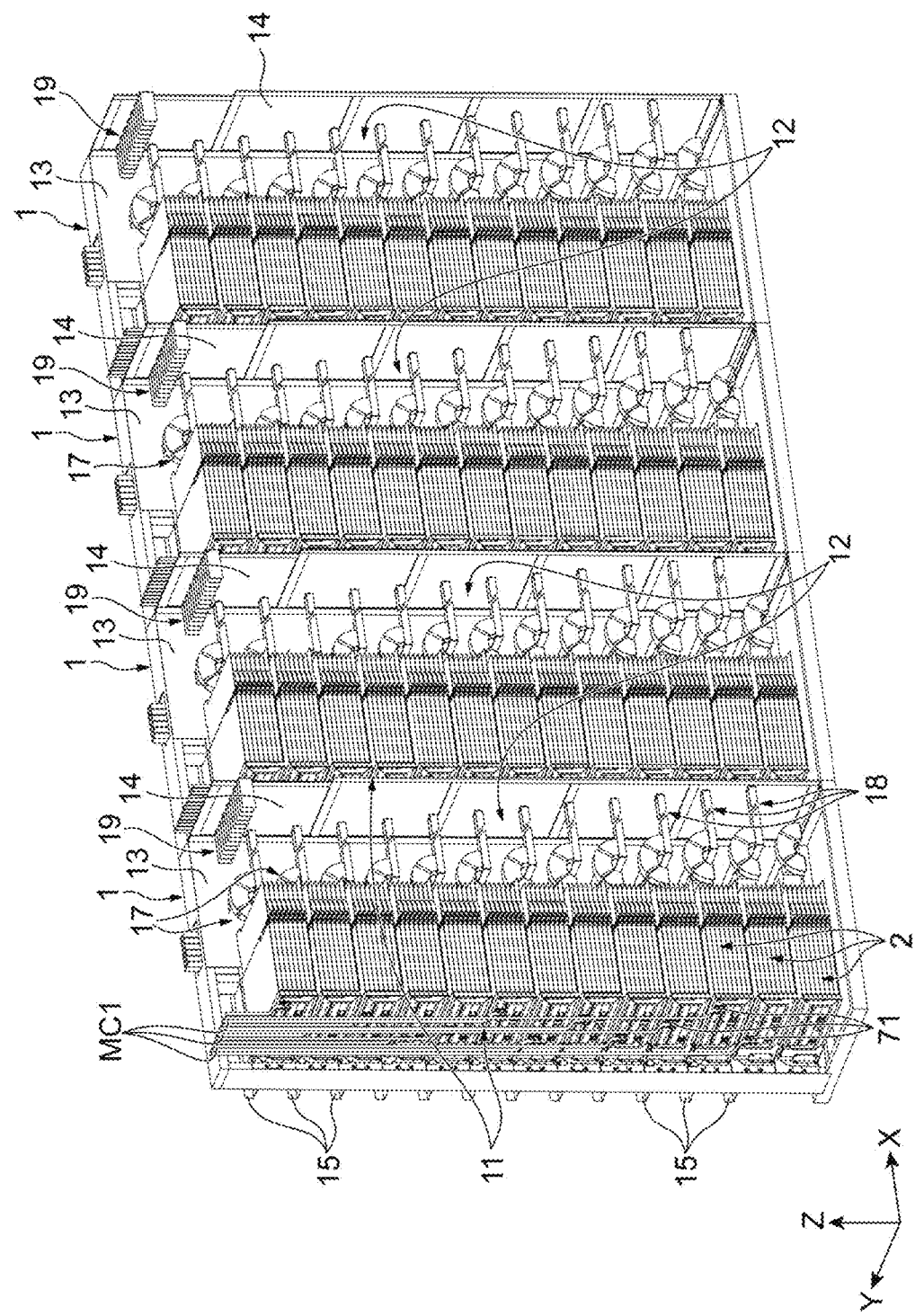
FIG. 1 is a diagram illustrating a state in which optical fiber racks according to an embodiment are arranged in one direction.

Description of Embodiment of the Present Disclosure

First, the contents of the embodiments of the present disclosure will be described in a listing manner.

An embodiment of the present disclosure is a termination unit to be located on a rack part of an optical fiber rack. The termination unit includes a housing, a plurality of first optical fibers located in the housing and fusion spliced to a multi fiber cable introduced from an outside of the optical fiber rack, a plurality of external connection adapters located in a line in a first direction, the plurality of first optical fibers being respectively connected to the plurality of external connection adaptors on an inside of the housing, a guide part located on one side surface of the housing and extending in a second direction crossing the first direction, the one side surface extending to cross the first direction, and a fixing member attached to the one side surface of the housing, the multi fiber cable being fixed thereto. The fixing member is movably attached along the guide part.

In the optical fiber rack, each of the termination units is located on a rack body in a state into which the optical fiber cord is introduced in advance. In this case, to set positions of the respective optical fiber cords as described above, position and order of locating each of the termination units on a line side rack body are preset. For this reason, it is necessary to observe the position and order of locating each termination unit, so that construction of the optical wiring board tends to be complicated. In addition, at the time of the construction of the optical wiring board, for example, confirmation work or the like selecting an appropriate termination unit according to the order one by one is also necessary.

On the other hand, the termination unit according to the above-described embodiment includes the fixing member to which the multi fiber cable is fixed. The fixing member is attached to the one side surface of the housing so as to be movable along the guide part extending in the second direction. Therefore, the multi fiber cable fusion spliced to the plurality of first optical fibers is movable in the second direction in conjunction with the fixing member. In this case, even after the termination unit is located on the rack part, position of the fixing member in the rack part, and of the multi fiber cable moving in conjunction with the fixing member can be adjusted. Therefore, since it is possible to perform construction work of the optical fiber rack without observing the position and order in which the respective termination units are located on the rack part, it is possible to facilitate and simplify the construction work of the optical fiber rack.

The fixing member may include a main part attached to the housing and a fixing part protruding from the main part, wherein the multi fiber cable is fixed to the fixing part. In this case, the multi fiber cable can be easily fixed to the fixing part by binding or the like.

The fixing member may be pivotably attached to the one side surface, and the termination unit may further include a holding member that determines a position of the fixing member in the second direction and an orientation of the fixing member. In this case, since the position and orientation of the multi fiber cable can be held in an appropriate state in each case when the termination unit is located on the rack part, and when the termination unit is not located on the rack part, breakage or the like of the multi fiber cable can be suppressed.

The termination unit may further include a cover configured to house a second optical fiber exposed from the multi fiber cable, the second optical fiber being exposed from the housing, and the cover may be attached to the one side surface of the housing. In this case, it is possible to prevent the second optical fiber exposed from the housing from being exposed from the termination unit, so that breakage or the like of the second optical fiber can be suppressed. Here, "to be exposed from the housing" means that the second optical fiber is present outside the housing, and, for example, includes not only a state in which the second optical fiber is exposed but also a state in which it is drawn to the outside of the housing in a state where its periphery is covered with a simple protective member, for example, a protective tube.

Detail of Embodiment of the Present Disclosure

Preferred embodiments of the present disclosure will now be described in detail with reference to the accompanying drawings. In the following description, the same components or components having the same function are designated by the same reference sign, and a duplicated description is omitted.

Figure 2:
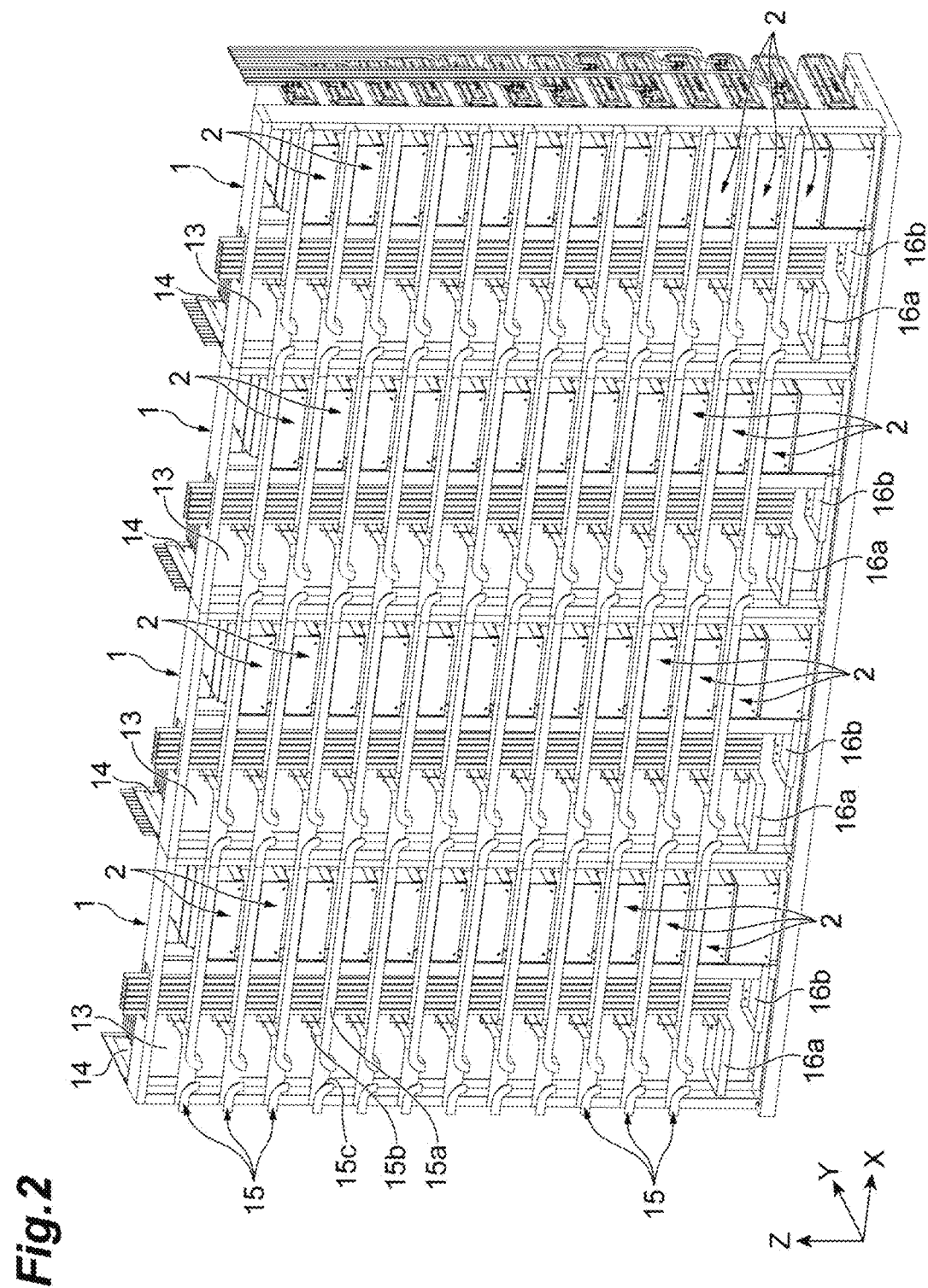
FIG. 2 is a diagram of FIG. 1 as viewed from a back side.
Figure 3:
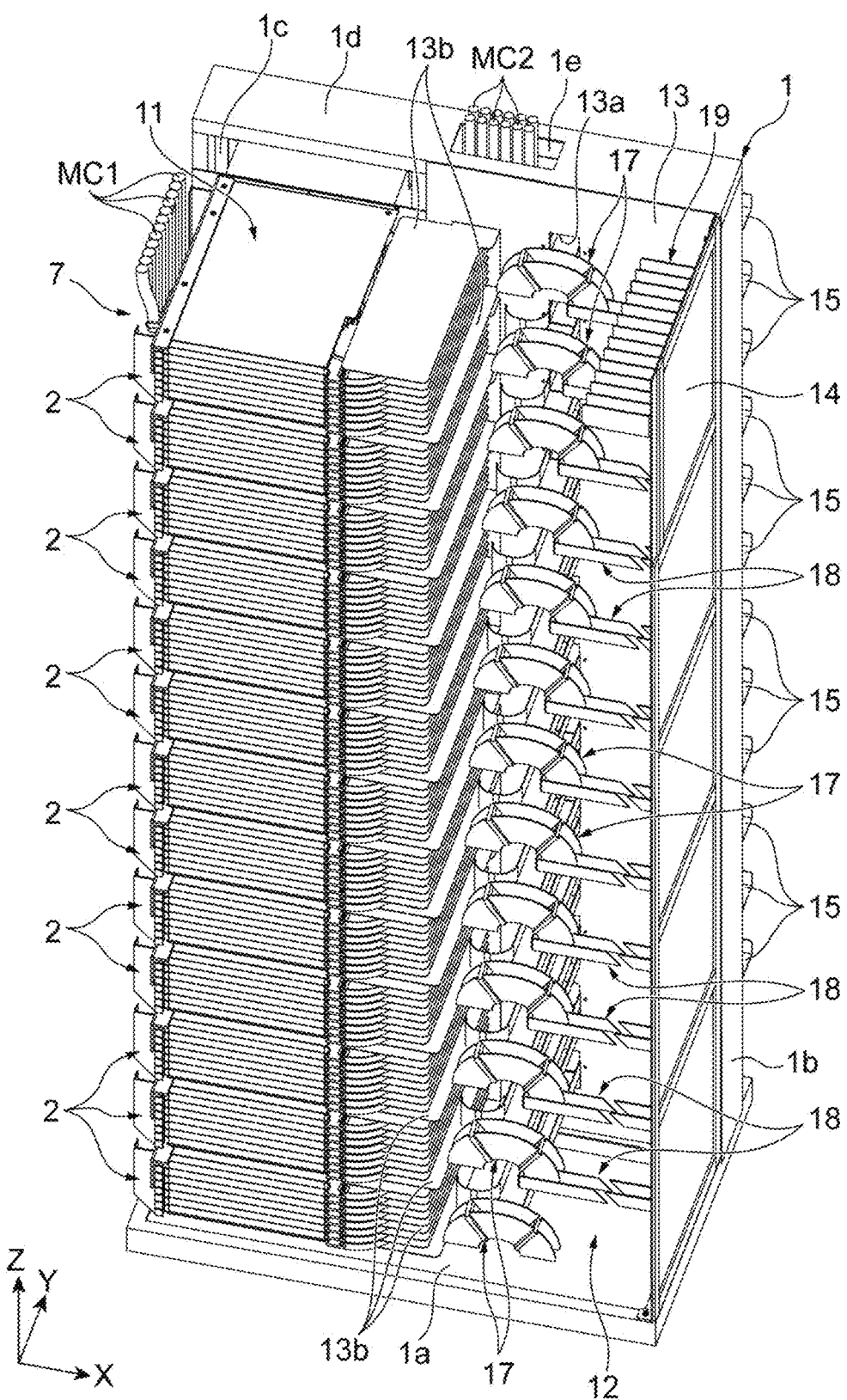
FIG. 3 is a schematic perspective view illustrating the optical fiber rack according to the embodiment.
Figure 4:
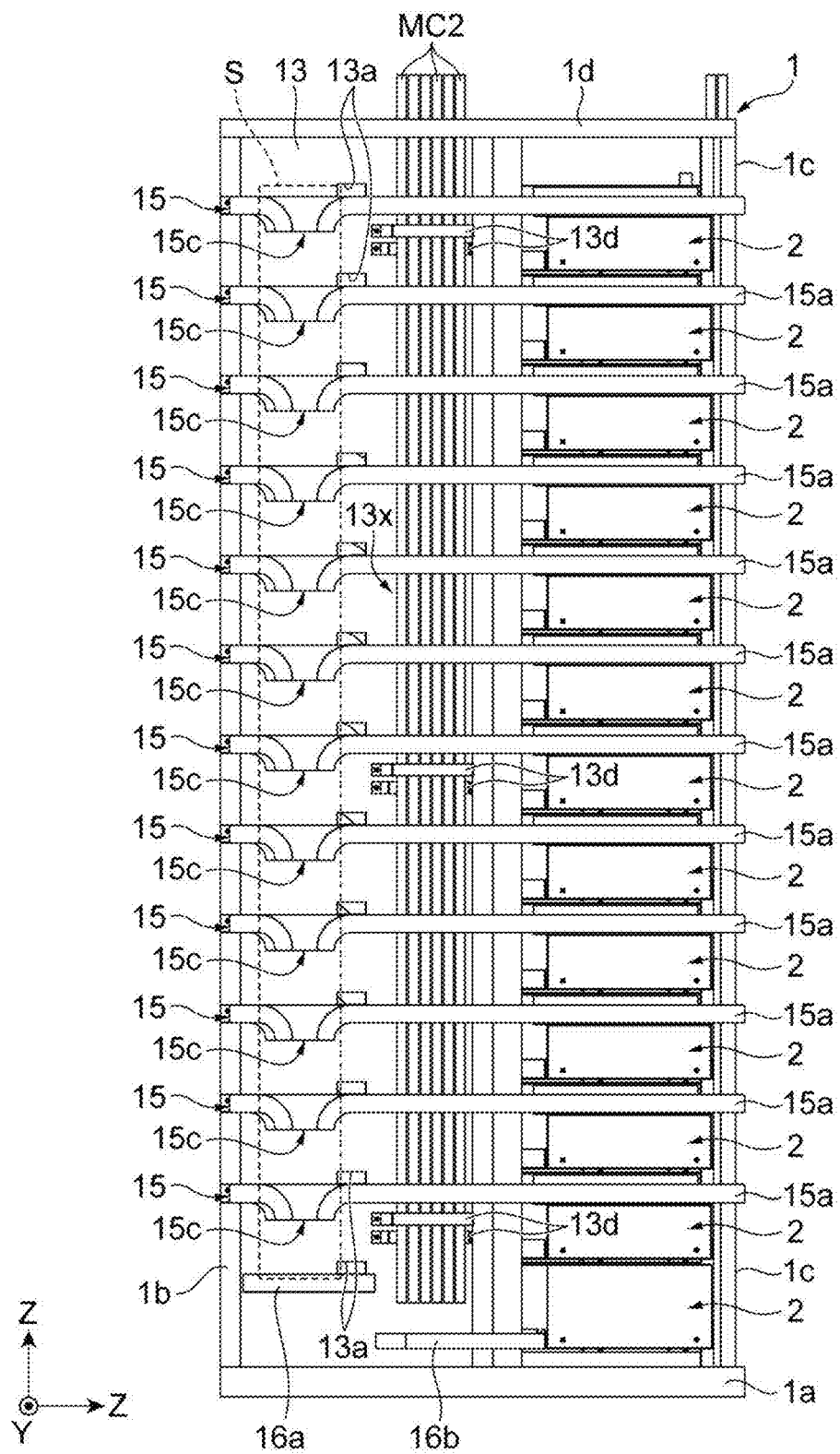
FIG. 4 is a back side view illustrating the optical fiber rack according to the embodiment.

FIG. 1 is a diagram illustrating a state in which optical fiber racks according to the present embodiment are arranged in one direction, and FIG. 2 is a diagram of FIG. 1 as viewed from a back side. FIG. 3 is a schematic perspective view illustrating the optical fiber rack according to the embodiment, and FIG. 4 is a back side view illustrating the optical fiber rack according to the embodiment. Hereinafter, a direction in which a plurality of optical fiber racks are arranged is defined as a direction X (right and left direction, first direction in the present embodiment), a direction crossing (for example, orthogonal to) the direction X in a horizontal direction is defined as a direction Y (front and rear direction, second direction in the present embodiment), a direction crossing (for example, orthogonal to) the direction X and the direction Y is defined as a direction Z (vertical direction).

An optical fiber rack 1 illustrated in FIG. 1 to FIG. 4 is an apparatus used when terminating the optical fiber cord at a data center or the like, and is also referred to as FDF (Fiber Distributing Frame), for example. In the optical fiber rack 1, a termination unit 2 (details will be described later) is located, which retains many optical fiber, and houses connection points. In the optical fiber rack 1, the multi fiber cable optically connected to the termination unit 2 is divided into a plurality of optical fibers and subjected to line-arrangement. The multi fiber cable is an optical fiber having several tens to several hundreds of optical fibers. In the embodiment, the multi fiber cable has 288 optical fibers. In FIG. 1 to FIG. 4, a part of optical fiber cords (optical fiber) are omitted.

Next, a specific configuration of the optical fiber rack 1 will be described. The optical fiber rack 1 is composed of a bottom frame part 1a as a pedestal, a pair of vertical frame parts 1b and 1c extending from the bottom frame part 1a in the direction Z, and a top frame part 1d provided on top faces of the vertical frame parts 1b and 1c, and has a frame-like outer shape. The optical fiber rack 1 includes a rack part 11, an optical fiber housing part 12, a partition plate 13, a lateral plate 14, a plurality of rails 15, trays 16a and 16b, a plurality of optical fiber guides 17, a plurality of first dividing members 18, and a second dividing member 19.

The rack part 11 is a part on which a plurality of termination units 2 arranged in the direction Z are located. In the rack part 11, a plurality of shelf plates, not illustrated in the figure, are provided side by side in the vertical direction, for example, and the termination unit 2 is located on each shelf plate. Each of the plurality of shelf plates may be provided to be slidable in the direction Y.

Figure 5A:
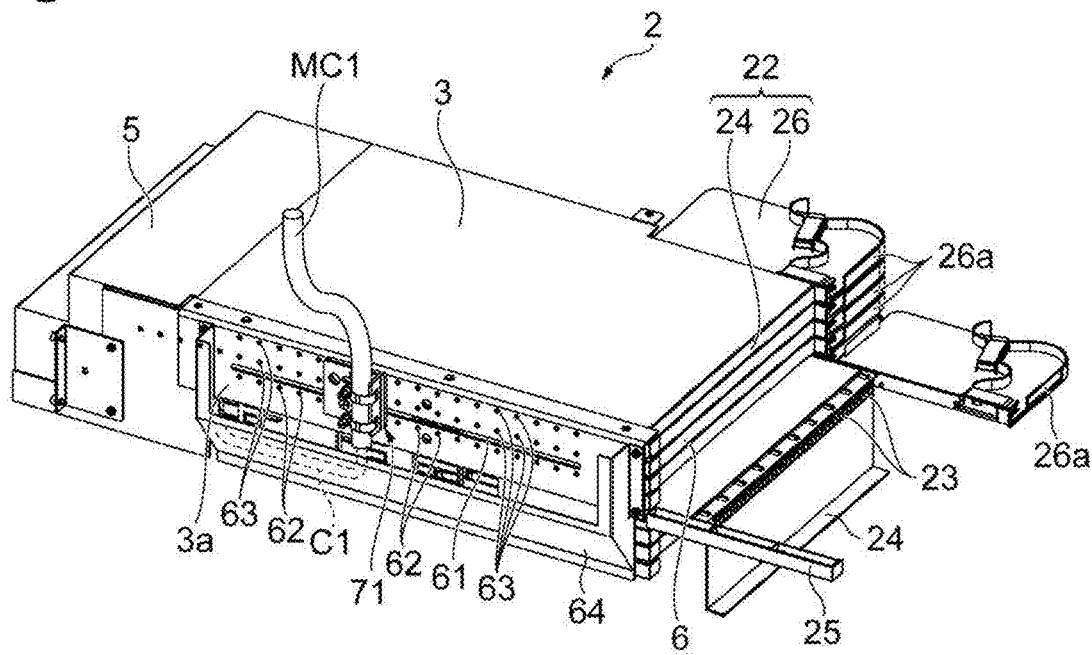
FIG. 5A is a front side perspective view of a termination unit and FIG. 5B is a back side perspective view of the termination unit.
Figure 5B:
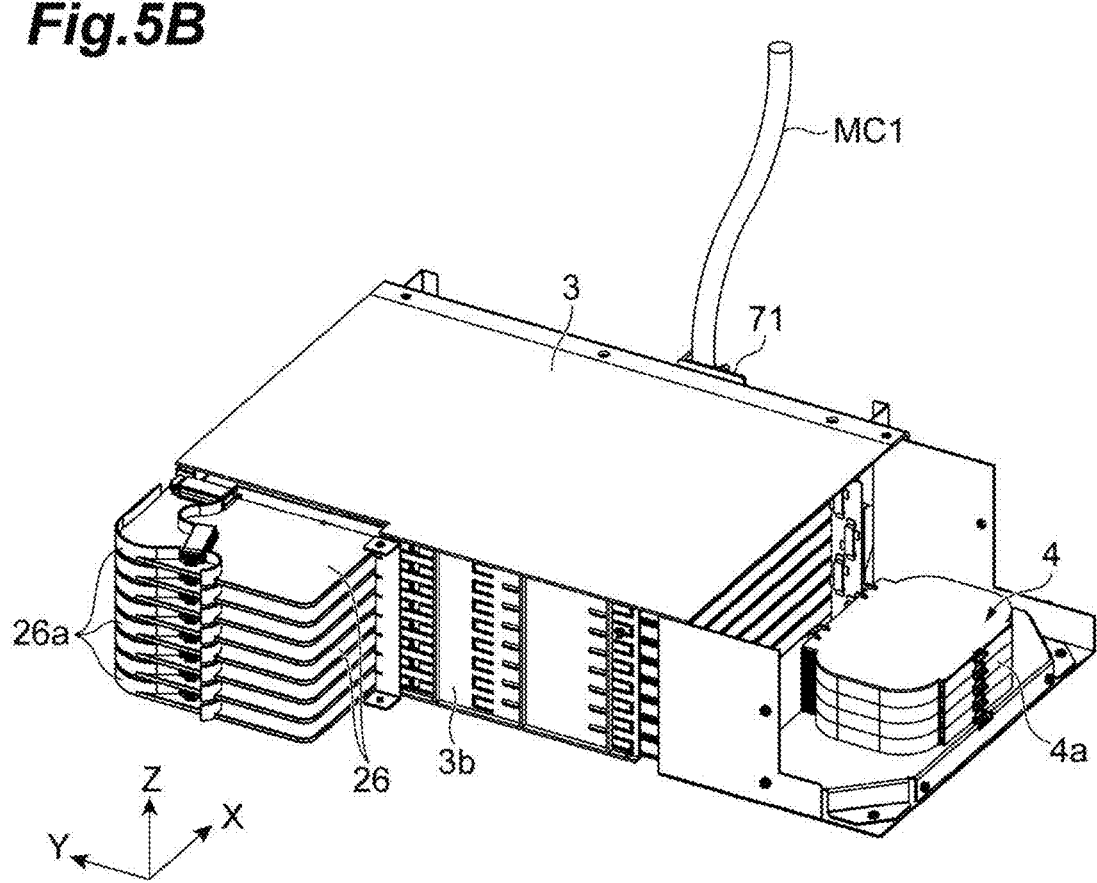
Figure 6:
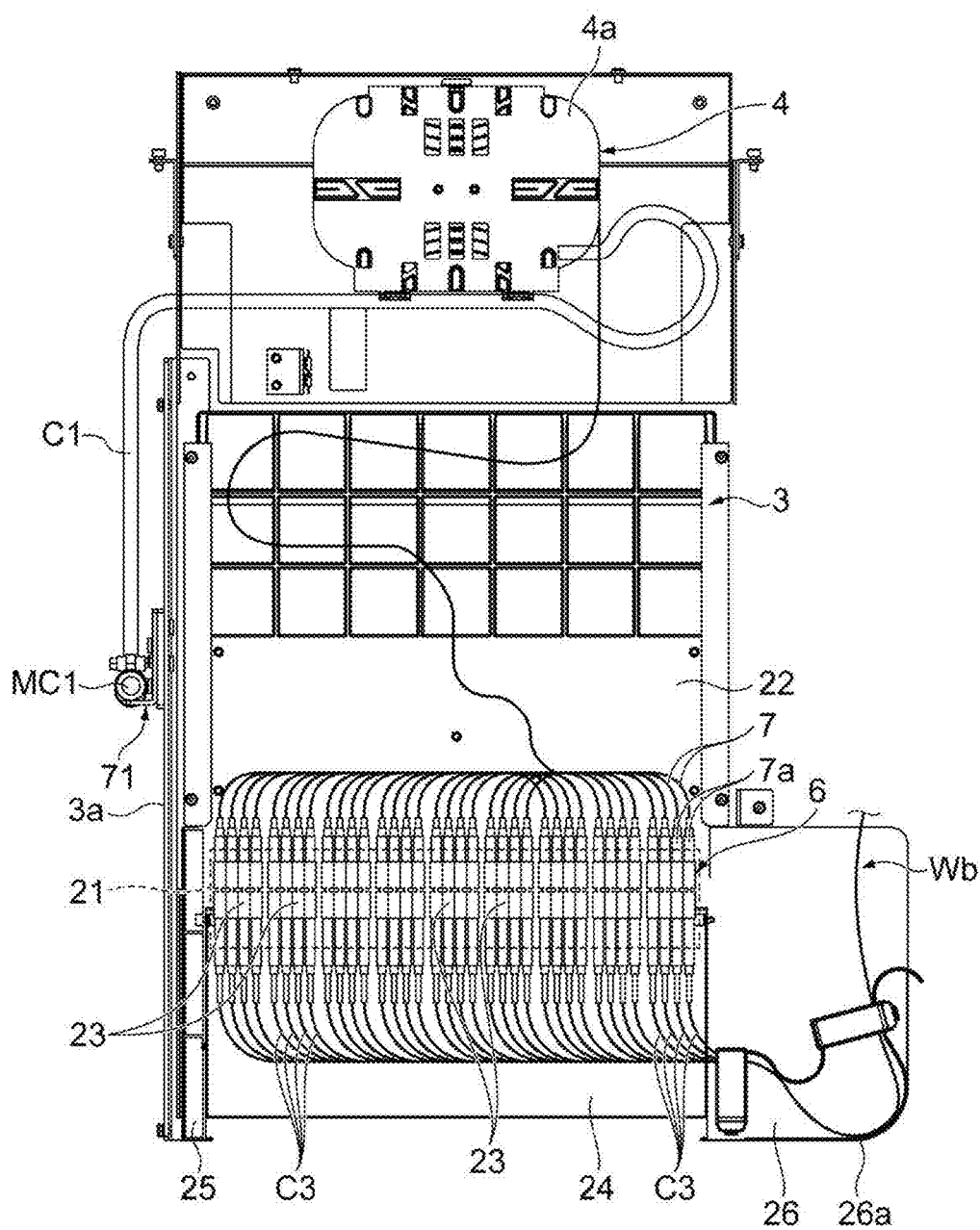
FIG. 6 is a diagram illustrating a part of an interior of the termination unit.
Figure 7:
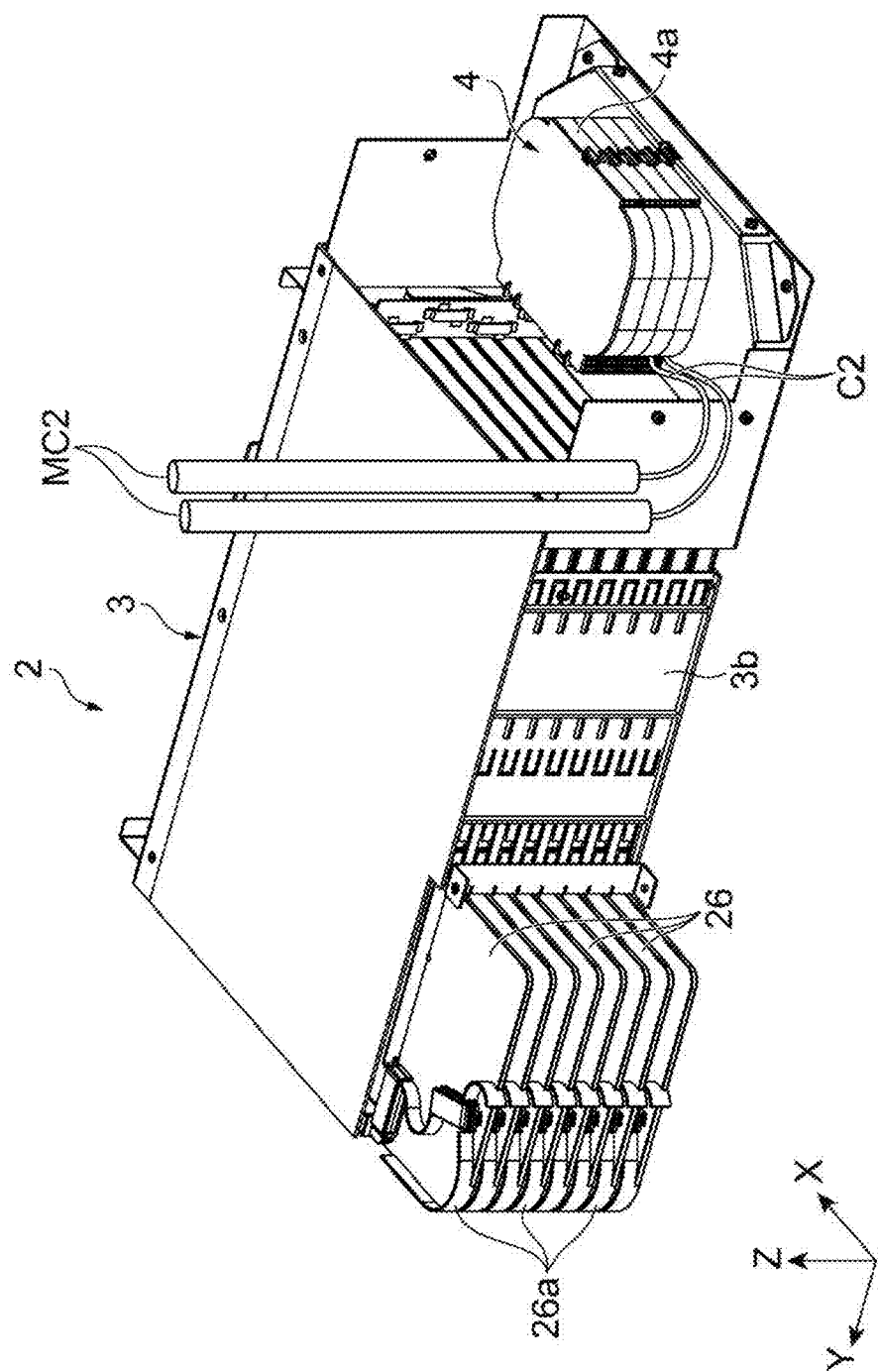
FIG. 7 is a diagram illustrating a termination unit positioned at a lowermost position in a rack part.

Here, functions and configuration of the termination unit 2 will be described with reference to FIG. 5A to FIG. 7. FIG. 5A is a front side perspective view of the termination unit 2. FIG. 5B is a back side perspective view of the termination unit 2. FIG. 6 is a diagram illustrating a part of an interior of the termination unit 2. FIG. 7 is a diagram illustrating the termination unit 2 positioned at a lowermost position in the rack part 11. As illustrated in FIG. 5A, FIG. 5B, and FIG. 6, the termination unit 2 includes a housing 3, a first external connection part 4 provided on a back end side of the housing 3, a lid part 5 covering the first external connection part 4, a second external connection part 6 provided on a front side of the termination unit 2 in the direction Y, a plurality of first optical fibers 7 with connector provided in the housing 3. The first optical fiber 7 with connector has an optical fiber and an optical connector 8a as described below. The first optical fiber 7 with connector is hereinafter simply referred to as the first optical fiber 7.

The housing 3 has a substantially rectangular parallelepiped shape and houses the second external connection part 6 and the first optical fiber 7. The housing 3 has a side surface 3a (one side surface) that crosses the direction X and is positioned on the right side thereof and a side surface 3b that faces the side surface 3a. The side surface 3a is provided with a slit part 61 extending in the direction Y, a plurality of first screw holes 62 positioned below the slit part 61, and a plurality of second screw holes 63 positioned above the slit part 61.

The slit part 61 is an elongated opening positioned near the center of the side surface 3a in the vertical direction and functions as a guide part guiding movement of a fixing member 71 described later. One end of the slit part 61 in the direction Y is positioned on the front side with respect to the rear end of the side surface 3a and on the rear side with respect to the center of the side surface 3a. The other end of the slit part 61 in the direction Y is positioned on the rear side with respect to the front end of the side surface 3a and on the front side with respect to the center of the side surface 3a. A width of the slit part 61 in the direction Z is about the same as diameters of openings 72a, 72b, 74a, 74b of the fixing member 71 described later.

Each of the first screw hole 62 and the second screw hole 63 is a female screw part to which a later-described male screw 83 can be fastened. The plurality of first screw holes 62 are arranged in one row along the slit part 61. The first screw holes 62 adjacent to each other are provided at a predetermined interval. Like the plurality of first screw holes 62, the plurality of second screw holes 63 are arranged along the slit part 61. The rows formed by the plurality of second screw holes 63 are arranged in two rows in the upper and lower direction. In each of the directions Y and Z, the second screw holes 63 adjacent to each other are provided at the predetermined interval similarly to the plurality of first screw holes 62. An interval between the adjacent first screw holes 62 and an interval between the adjacent second screw holes 63 are the same as each other.

A multi fiber cable MC1, for example, extending from the fusion rack or the like to the optical fiber rack 1, is introduced into the termination unit 2 from the side of the side surface 3a of the housing 3. A plurality of second optical fibers C1 are housed in the multi fiber cable MC1, a part of the second optical fibers C1 therein are separated from each other and exposed from the outer peripheral coating of the multi fiber cable MC1. These separated second optical fibers C1 are covered, for example, in their periphery by tubes having flexibility, and are housed in the housing 3 with a surplus length. The multi fiber cable MC1 is fixed by the fixing member 71 movable along the slit part 61 on the side of the side surface 3a of the housing 3. As illustrated in FIG. 1, the position at which each fixing member 71 is fixed varies depending on the position of the termination unit 2 located on the rack part 11. The configuration of the fixing member 71 will be described in detail later. the tube may have flexibility, a plurality of tubular members connected in a penetrating direction, a bellows shape, a spiral tube, or the like. The material of the tube may be, for example, plastic or metal, but is not limited thereto.

As illustrated in FIG. 5A, depending on a position of the fixing member 71, the second optical fiber C1 exposed from the multi fiber cable MC1 may be exposed from the housing 3 together with the tube covering its periphery. In this case, the second optical fiber C1 exposed from the housing 3 is housed by a cover 64 attached to the side surface 3a of the housing 3 together with the tube that covers the periphery thereof. The cover 64 is provided below the fixing member 71 so as not to hinder movement of the fixing member 71. The upper end of the cover 64 is provided to be spaced apart from the side surface 3a to easily house the second optical fiber C1 and the tube covering the periphery thereof. Further, a length of the cover 64 in the direction Y is larger than a length of the slit part 61. Therefore, when the multi fiber cable MC1 is fixed to the fixing member 71, the second optical fiber C1 and the tube can be housed regardless of the position of the fixing member 71.

Figure 8A:
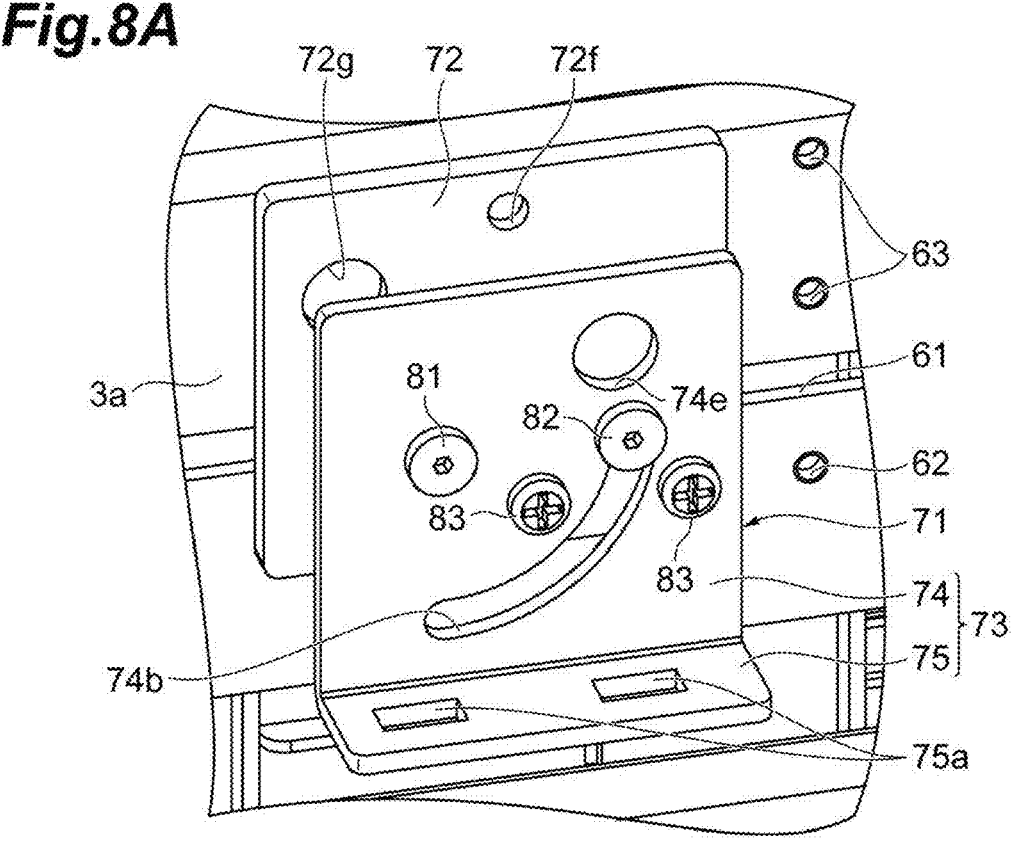
FIG. 8A and FIG. 8B are enlarged views of a main part illustrating a fixing member attached to a housing.
Figure 8B:
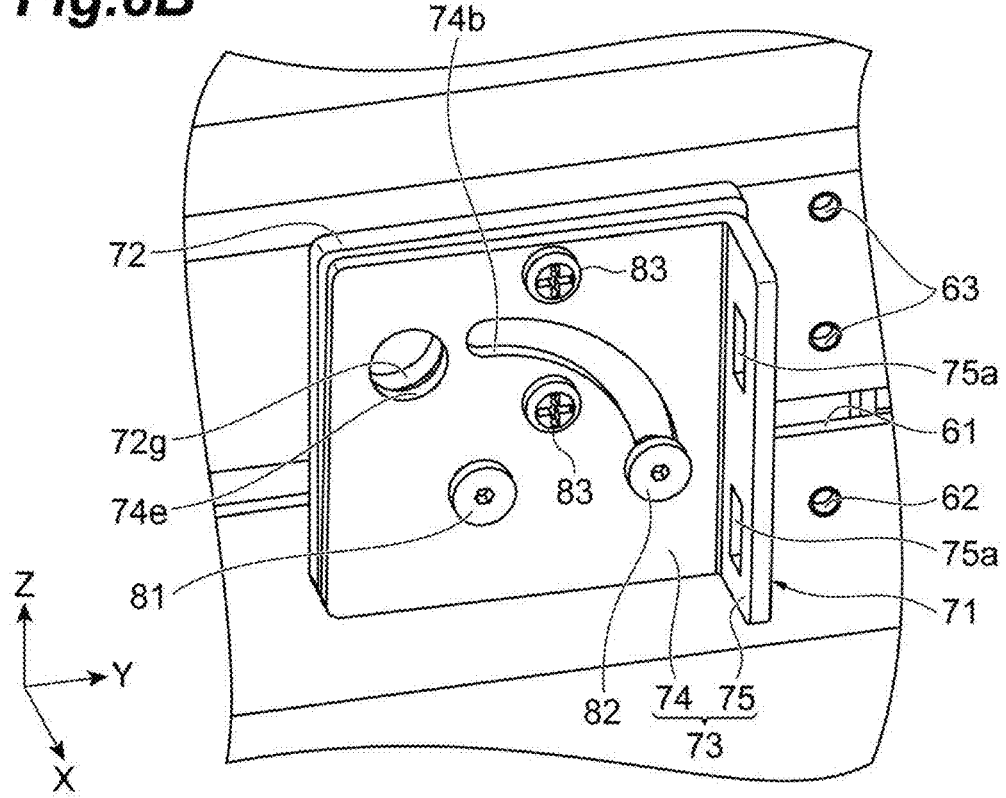
Figure 9A:
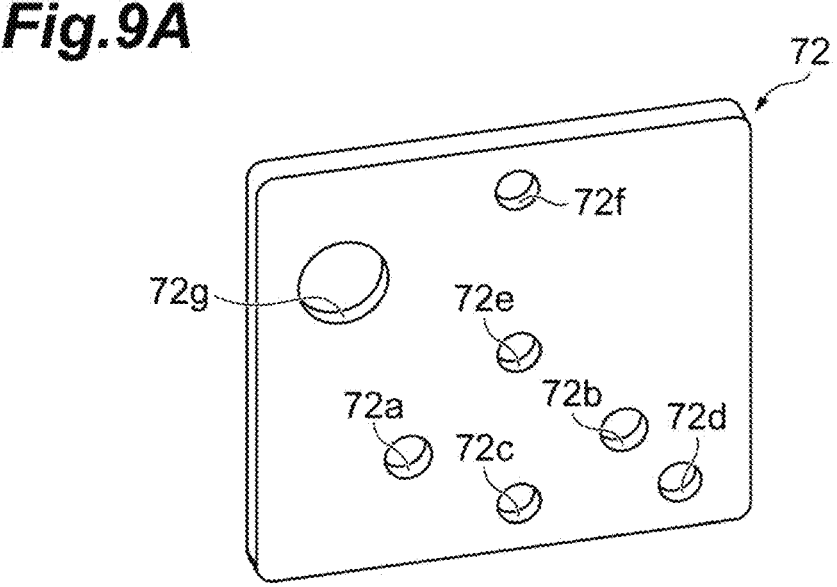
FIG. 9A is an enlarged view of a main part illustrating a part of the fixing member and FIG. 9B is an enlarged view of a main part illustrating another part of the fixing member.
Figure 9B:
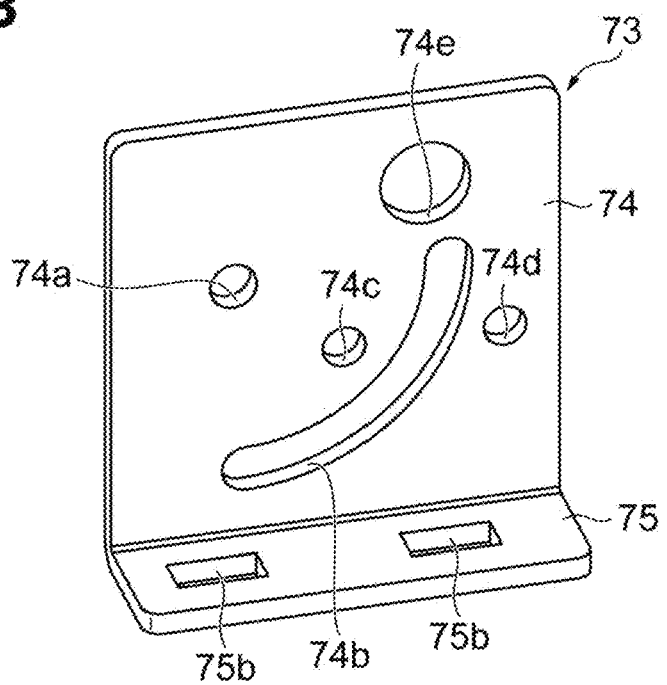
Figure 9B:
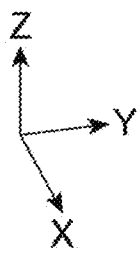
Figure 10A:
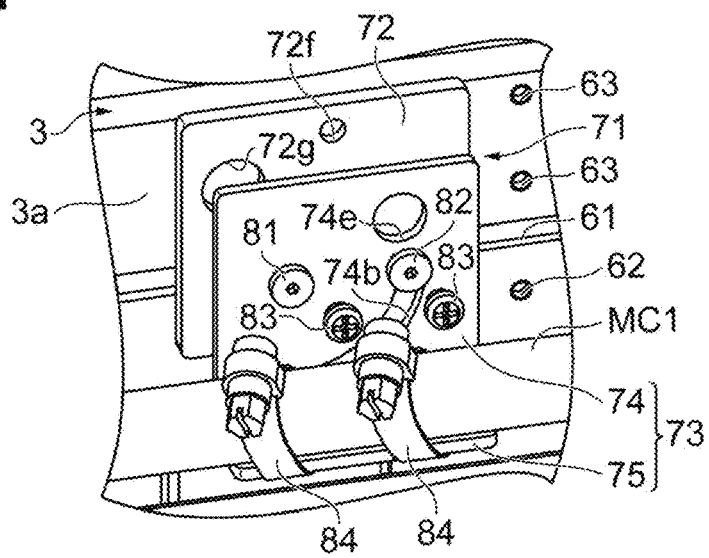
FIG. 10A to FIG. 10C are enlarged views of a main part illustrating respective states of a fixing member to which a multi fiber cable is fixed.
Figure 10B:
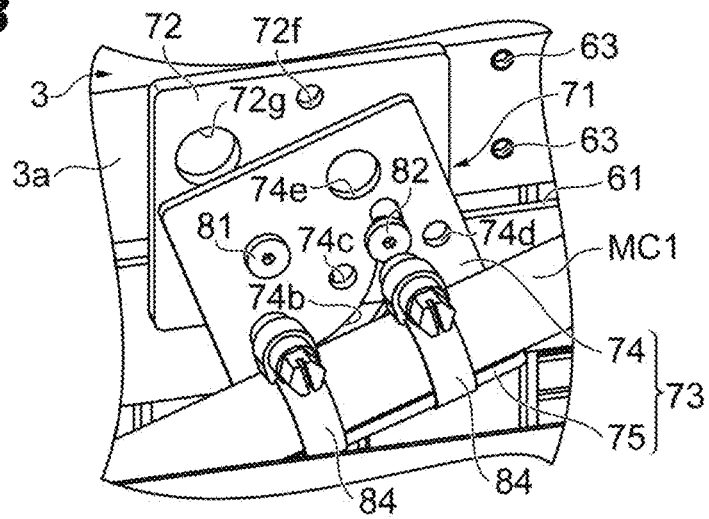
Figure 10C:
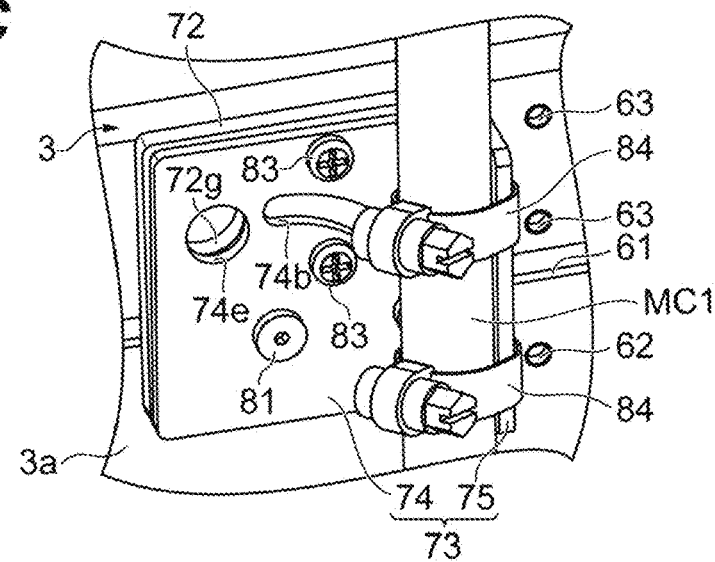

Here, with reference to FIG. 8A to FIG. 10C in addition to FIG. 5A, the configuration of the fixing member 71 for fixing the multi fiber cable MC1 to the termination unit 2 will be described. FIG. 8A and FIG. 8B are enlarged views of a main part illustrating a fixing member 71 attached to the housing 3. FIG. 9A is an enlarged view of a main part illustrating a part of the fixing member 71, and FIG. 9B is an enlarged view of a main part illustrating another part of the fixing member 71. FIG. 10A to FIG. 10C are enlarged views of main parts illustrating respective states of the fixing member 71 to which the multi fiber cable MC1 is fixed. As illustrated in FIG. 5A, FIG. 8A, FIG. 8B, and FIG. 10A, FIG. 10C, the fixing member 71 is a member to which the multi fiber cable MC1 is fixed in the termination unit 2, and is attached to the side surface 3a of the housing 3. Specifically, the fixing member 71 is attached to the side surface 3a of the housing 3 by fastening members 81 and 82 inserted through the slit part 61 and the male screw 83 fastened to either the first screw hole 62 or the second screw hole 63. The position of the upper end of the fixing member 71 in the direction Z is substantially the same as the upper end position of the housing 3.

The fixing member 71 includes a first plate 72 and a second plate 73 that overlap each other in the direction X. The first plate 72 is a plate-like member positioned between the side surface 3a of the housing 3 and the second plate 73 in the direction X. The first plate 72 is provided with the opening 72a through which the fastening member 81 is inserted, an opening 72b through which the fastening member 82 is inserted, openings 72c to 72f through which the male screw 83 is inserted, and the opening 72g.

When the fixing member 71 is attached to the housing 3, each of the openings 72a and 72b is provided to always overlap with the slit part 61 in the direction X. In addition, each of the openings 72c and 72d is provided to overlap with the first screw hole 62 in the direction X, and each of the openings 72e and 72f is provided to overlap with the second screw hole 63 in the direction X. When viewed from the direction X, an interval between the openings 72c and 72d and an interval between the openings 72e and 72f are respectively the same as an interval between the adjacent first screw holes 62 and an interval between the adjacent second screw holes 63.

The second plate 73 is a plate-like member positioned on the outermost side of the fixing member 71, and includes a main part 74 attached to the housing 3 via the fastening members 81, 82 and the male screw 83, and a fixing part 75 protruding from the main part 74 in the direction X and to which the multi fiber cable MC1 is fixed. Hereinafter, a state in which the fixing part 75 is positioned at the lower end as illustrated in FIG. 8A and FIG. 10A is referred to as a first orientation state, and a state in which the fixing part 75 is positioned on the front side as illustrated in FIG. 8B and FIG. 10C is referred to as a second orientation state. Further, as illustrated in FIG. 10B, a state in which the fixing member 71 is not fixed by the male screw 83 is referred to as a transitionable state.

The main part 74 is a member having a substantially rectangular plate shape and is provided to overlap with the surface of the first plate 72. As illustrated in FIG. 9A, the main part 74 includes an opening 74a through which the fastening member 81 is inserted, an opening 74b through which the fastening member 82 is inserted, openings 74c and 74d through which the male screws 83 are inserted respectively, and an opening 74e. When the fixing member 71 is attached to the housing 3, the opening 74a is always provided to overlap with the opening 72a. Therefore, when the fixing member 71 is attached to the housing 3, the opening 74a always overlaps with the slit part 61 in the direction X.

The opening 74b has a substantially circular arc shape as viewed from the direction X. Specifically, the opening 74b is provided to form a part of an arc drawn around the opening 74a. In addition, when the fixing member 71 is attached to the housing 3, a part of the opening 74b is always provided to overlap with the opening 72b. In addition, when the fastening member 82 is inserted through the opening 74b, the fastening member 82 has a size movable along the shape of the opening 74b. Therefore, when the fastening members 81 and 82 are inserted into the openings 74a and 74b, respectively, an interval between the fastening members 81 and 82 as viewed in the direction X is always constant. That is, in each of the first orientation state, the second orientation state, and the transitionable state, an interval between the fastening members 81 and 82 as viewed from the direction X is the same. In the present embodiment, when a fan shape having the center of the opening 74a as a center point and the opening 74b as a circular arc part is set, a central angle of the fan shape is about 90°.

The openings 74c and 74d are provided to overlap respectively with the openings 72c and 72d of the first plate 72 in the first orientation state. In addition, the openings 74c and 74d are provided to overlap respectively with the openings 72e and 72f of the first plate 72 in the second orientation state. Therefore, an interval between the openings 74c and 74d is the same as an interval between the adjacent first screw holes 62 and an interval between the adjacent second screw holes 63. The opening 74e has substantially the same shape as the opening 72g of the first plate 72, and overlaps with the opening 72g in the second orientation state.

The fixing part 75 is a part that protrudes from one end of the main part 74 in the direction X and is a part to which the multi fiber cable MC1 is fixed (see FIG. 10A and FIG. 10C). The fixing part 75 is formed by bending a part of the main part 74, and has a substantially rectangular plate shape. Therefore, the second plate 73 has a substantially L-shaped cross section. An amount of protrusion of the fixing part 75 is, for example, larger than an outer radius of the multi fiber cable MC1 and smaller than an outer diameter. The fixing part 75 includes a plurality of openings 75a. As illustrated in FIG. 10A and FIG. 10C, when the multi fiber cable MC1 is fixed to the fixing part 75, a binding member 84 for binding the multi fiber cable MC1 to the fixing part 75 passes through the opening 75a. The binding member 84 has, for example, a string shape or a band shape and has a length which can be wound around both the multi fiber cable MC1, and the end part that defines the opening 75a in the fixing part 75. The binding member 84 is a separate member from the fixing member 71, but may be formed into one body with the fixing member 71.

Each of the fastening members 81 and 82 is a bolt nut, for example, and is provided to be movable along the slit part 61. The bolt of the fastening member 81 is inserted from the outside to the inside of the housing 3 via the opening 72a of the first plate 72, the opening 74a of the main part 74, and the slit part 61, and is screwed to the nut inside the housing 3. Similarly, the bolt of the fastening member 82 is inserted from the outside to the inside of the housing 3 via the opening 72b of the first plate 72, the opening 74b of the main part 74, and the slit part 61, and is screwed to the nut inside the housing 3. Therefore, for example, when the fixing member 71 is not fastened by the male screw 83 as in the transitionable state illustrated in FIG. 10B, the fixing member 71 is hooked by the fastening members 81 and 82. Here, each of the fastening members 81 and 82 does not firmly fasten the side surface 3a and the fixing member 71. Therefore, in the transitionable state, the fixing member 71 can move in the direction Y in conjunction with the fastening members 81 and 82. In addition, the second plate 73 is pivotable around the fastening member 81 and within a range restricted by the fastening member 82 and the opening 74b. That is, in the transitionable state, the orientation of the fixing member 71 can also be changed. For example, as illustrated in FIG. 10A to FIG. 10C, the fixing member 71 can be changed from the first orientation state to the second orientation state while the fixing member 71 is attached to the housing 3 via the fastening members 81 and 82. In the present embodiment, an orientation of the second plate 73 can be changed by about 90°.

The male screw 83 is a member fastened from the outside of the housing 3 to the first screw hole 62 or the second screw hole 63 via the fixing member 71. The position of the fixing member 71 and the orientation of the fixing member 71 in the direction Y can be determined by fastening the male screw 83 to the arbitrary first screw hole 62 or the second screw hole 63. Therefore, the male screw 83 functions as a holding member determining the position and orientation of the fixing member. In addition, by using the male screw 83, it is possible to satisfactorily suppress the change in the orientation of the fixing member 71 even after the multi fiber cable MC1 is fixed to the fixing part 75. In the first orientation state, one male screw 83 is fastened to one of the first screw holes 62 overlapping the openings 72c and 74c, and the other male screw 83 is fastened to another one of the first screw holes 62 overlapping the openings 72d and 74d. Further, in the second orientation state, one male screw 83 is fastened to one of the second screw holes 63 overlapping the openings 72e and 74c, and the other male screw 83 is fastened to another one of the second screw holes 63 overlapping the openings 72f and 74d.

Returning to FIG. 5A to FIG. 7, the first external connection part 4 is a part to which the multi fiber cable is optically connected to the termination unit 2, and has a fusion tray 4a housing a part where the optical fibers are fusion spliced to each other. In the present embodiment, the second optical fiber C1 housed in the multi fiber cable MC is introduced into the first external connection part 4 in the termination unit 2 other than the termination unit 2 positioned at a lowermost position. In the fusion tray 4a, the second optical fiber C1 jumped out from the multi fiber cable MC1 and one end of the plurality of first optical fibers 7 are optically connected by fusion spliced. The fusion splicing may be performed after the termination unit 2 is located on the rack part 11 or may be performed before the termination unit 2 is located on the rack part 11. On the other hand, in the termination unit 2 positioned at a lowermost position, as illustrated in FIG. 7, an optical fiber C2 housed in a multi fiber cable (hereinafter, referred to as local fusion cable MC2) different from the multi fiber cable MC1 is introduced into the first external connection part 4. The optical fiber C2 jumped out from the local fusion cable MC2 is fusion spliced as described above after the termination unit 2 positioned at a lowermost position is located on the rack part 11.

The lid part 5 is a lid covering the first external connection part 4. The lid part 5 is detachably attached to the housing 3.

The second external connection part 6 is a part which optically connects the other end of the plurality of first optical fibers 7 to a bundle of optical fibers C3 (second optical fibers) (hereinafter referred to as an optical fiber bundle Wb) connected to an external device or the like (e.g., a server). The second external connection part 6 includes a plurality of adapter groups 21 stacked on each other, and a plurality of covers 22 dividing and protecting each adapter group 21. Each adapter group 21 has a plurality of adapters 23 (external connection adapters) for optically connecting the plurality of first optical fibers 7 housed in the housing 3, and the plurality of optical fibers C3 positioned outside the housing 3, respectively. Each optical fiber C3 constituting the optical fiber bundle Wb is connected from the outside (one end side of each adapter 23 in the direction Y) of the housing 3. The plurality of first optical fibers 7 are connected from the inside (the other end side of each adapter 23 in the direction Y) of the housing 3. The plurality of adapters 23 included in each adapter group 21 are arranged in a line in the direction X on the cover 22.

The covers 22 are positioned below the corresponding adapter group 21 and is formed into one body with the adapter group 21. Each cover 22 is provided to be extractable in the front and rear direction. Therefore, in conjunction with the extraction of the cover 22, the corresponding adapter group 21 is extracted. In addition, the cover 22 has a cover part 24 protecting the outer connection end of each adapter 23, and support parts 25 and 26 supporting the cover part 24. The cover part 24 is caught together and supported by the support parts 25 and 26. Further, the back end of the cover part 24 is pivotable about an axis extending in the direction X. Therefore, by extracting the cover part 24 and releasing a catching state of the support parts 25 and 26 with respect to the cover part 24, the cover part 24 can be pivoted downward. This allows the cover part 24 positioned in the vicinity of the outside connection end of the extracted adapter 23 to be moved, which facilitates connection of the optical fiber C3 to the relevant connection end. The support part 26 provided on another side surface of the housing 3 is provided with a guide 26a guiding the optical fiber bundle Wb in a predetermined direction.

An optical fiber other than the optical fiber C3 may be optically connected to the second external connection part 6 from the outside of the housing 3. For example, the optical fiber (cross-connect optical fiber) for connecting the termination units 2 different from each other to each other may be optically connected. A combination of the termination units 2 different from each other may be a combination of the different termination units 2 located on one optical fiber rack 1, or a combination of the termination unit 2 located on a certain optical fiber rack 1 and the termination unit 2 located on another optical fiber rack 1.

The first optical fiber 7 is an assembly of single optical fiber cords. One ends of the first optical fibers 7 are bundled and housed in the fusion tray 4a. The one ends are fusion spliced to the second optical fibers C1 housed in the multi fiber cable MC1 as described above. Further, an optical connector 7a is provided at the other end of the first optical fiber 7, and the optical connector 7a is connected to the other end side of the adapter 23.

Figure 11:
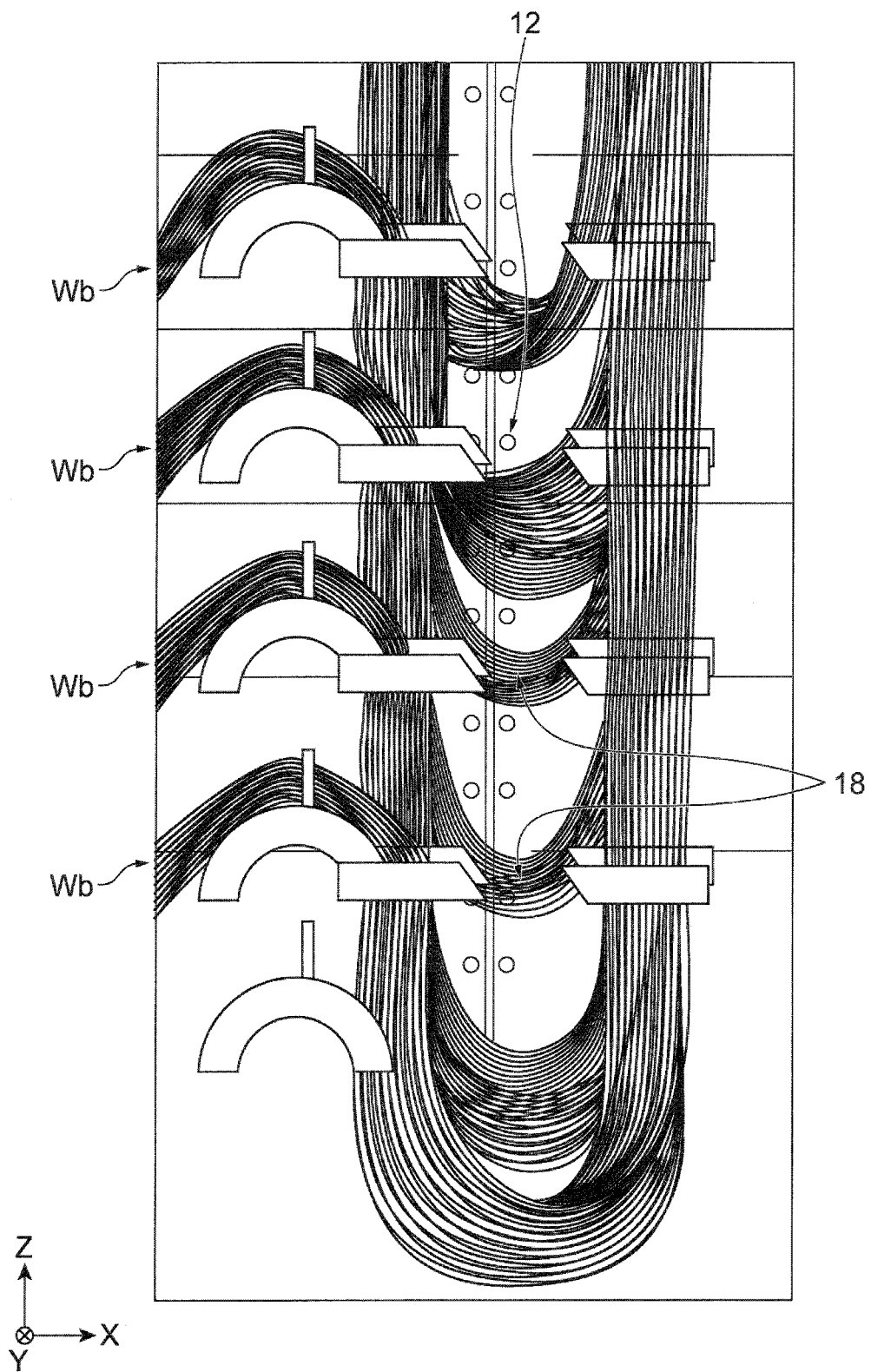
FIG. 11 is a photograph showing a state in which an extra length wiring part of an optical fiber bundle is housed in an optical fiber housing part.

Returning to FIG. 1 to FIG. 4, the optical fiber housing part 12 is positioned next to the rack part 11 in the direction X and houses the extra length wiring part of the optical fiber bundle Wb (see FIG. 6) connected to the termination unit 2. In the optical fiber housing part 12, each of the plurality of optical fiber bundles Wb is divided by a plurality of first dividing members 18 and second dividing members 19. FIG. 11 is a photograph showing a state in which the extra length wiring part of the optical fiber bundle Wb is housed in the optical fiber housing part 12. As shown in FIG. 11, the extra length wiring part of the optical fiber bundle Wb is housed in a hanging state, for example, assuming a U shape.

The partition plate 13 is a plate-like member provided to partition the optical fiber housing part 12 in the front and rear direction in the direction Y. The partition plate 13 is fixed by, for example, the bottom frame part 1a, the vertical frame part 1b, and the top frame part 1d. The partition plate 13 includes a plurality of openings 13a, a plurality of thin plate-like support part 13b (second support part), and a cable housing part 13x. The plurality of openings 13a are provided so that, for example, the optical fiber is directed from a front side of the partition plate 13 to a back side, or the optical fiber is directed from the back side to the front side of the partition plate 13. The plurality of openings 13a are provided in a line in the direction Z.

The support part 13b is a plate-like member supporting the optical fiber bundle Wb extending from the support part 26 (see FIG. 6) of the corresponding termination unit 2 to the optical fiber housing part 12. The support part 13b is provided side by side with the support part 26 in the direction Y, and in the present embodiment, it is provided behind the support part 26. The support part 13b is separate from the cover 22, and does not work in conjunction with the sliding operation of the cover 22. In one example, the support part 13b is attached to a surface of the partition plate 13. The support part 13b is provided on a side of the rack part 11 than an opening 13a. From the viewpoint of preventing inhibition of the sliding operation of the cover 22 by the optical fiber bundle Wb, the extra length wiring part of the optical fiber bundle Wb is provided on the support part 13b.

The support part 13b has a flat surface on which the optical fiber bundle Wb is located and supports the optical fiber bundle Wb in a freely extendable and bendable manner. In addition, since the support part 13b has a flat plate shape, a flat surface of the support part 13b extends to an edge of the support part 13b on the side of the optical fiber housing part 12. In other words, the wall-like part like the guide 26a of the support part 26 is not provided on the edge of the support part 13b on the side of the optical fiber housing part 12.

Returning to FIG. 1 to FIG. 4 again, the cable housing part 13x is an area housing the local fusion cable MC2 and is attached to a back surface of the partition plate 13, for example, via a fixing member 13d. The cable housing part 13x extends in the direction Z from the vicinity of the bottom frame part 1a to beyond the top frame part 1d via an opening 1e provided in the top frame part 1d, for example.

The lateral plate 14 is a plate-like member provided to partition the optical fiber racks 1 in the direction X. The lateral plate 14 is positioned on the opposite side of the rack part 11 with the optical fiber housing part 12 interposed therebetween, and is fixed to the bottom frame part 1a and the vertical frame part 1b or the partition plate 13.

The plurality of rails 15 are members guiding the optical fiber laid on a back side of the partition plate 13. Each of the plurality of rails 15 has a substantially U-shaped groove shape extending in the direction X. One end of each rail 15 is attached to the vertical frame part 1b, and the other end of each rail 15 is attached to the vertical frame part 1c. The one end and the other end of the rail 15 have shapes connectable with each other. Therefore, when arranging the optical fiber racks 1 in the direction X, it is possible to connect the rails 15 of the adjacent optical fiber racks 1 to each other. Further, in the direction Y, the rail 15 is apart from the partition plate 13 and the cable housing part 13x. Therefore, it is possible to suitably suppress contact between the optical fiber laid on the rail 15, and the optical fiber C2 housed in the local fusion cable MC2 in the cable housing part 13x.

The rail 15 has a main part 15a extending in the direction X, a branch part 15b branching and extending from the main part 15a, and a disconnect part 15c in which a part of the main part 15a is disconnected. The branch part 15b is a part extending from the main part 15a in the direction Y toward the corresponding opening 13a. The disconnect part 15c is provided on a back side of the optical fiber housing part 12 with the partition plate 13 interposed therebetween. The disconnect parts 15c are arranged in a line in the direction Z. In the main part 15a, a part forming the disconnect part 15c is curved toward the bottom frame part 1a. By forming such a disconnect part 15c, an optical fiber (for example, cross-connect optical fiber) positioned on the back side of the partition plate 13 can be laid on a plurality of rails, and the extra length wiring part of the optical fiber can be provided. In other words, on the back side of the optical fiber housing part 12 with the partition plate 13 interposed therebetween, a housing part S (second optical fiber housing part) in which the extra length wiring part of the optical fiber different from the optical fiber C3 in the optical fiber bundle Wb is housed can be provided.

The trays 16a and 16b are members locating the extra length wiring part of the optical fiber positioned on the back side of the partition plate 13 and are attached to the back surface of the partition plate 13. A tray 16a is provided between the disconnect part 15c of the rail 15 closest to the bottom frame part 1a in the direction Z, and the bottom frame part 1a. Thus, on the tray 16a, the extra length wiring part of the optical fiber provided on the disconnect part 15c can be located. Further, a tray 16b is provided between a lower area of the cable housing part 13x, and the bottom frame part 1a in the direction Z. Therefore, on the tray 16b, an extra length wiring part of the optical fiber C2 housed in the local fusion cable MC2 extending from the cable housing part 13x to the termination unit 2 can be located.

Figure 12:
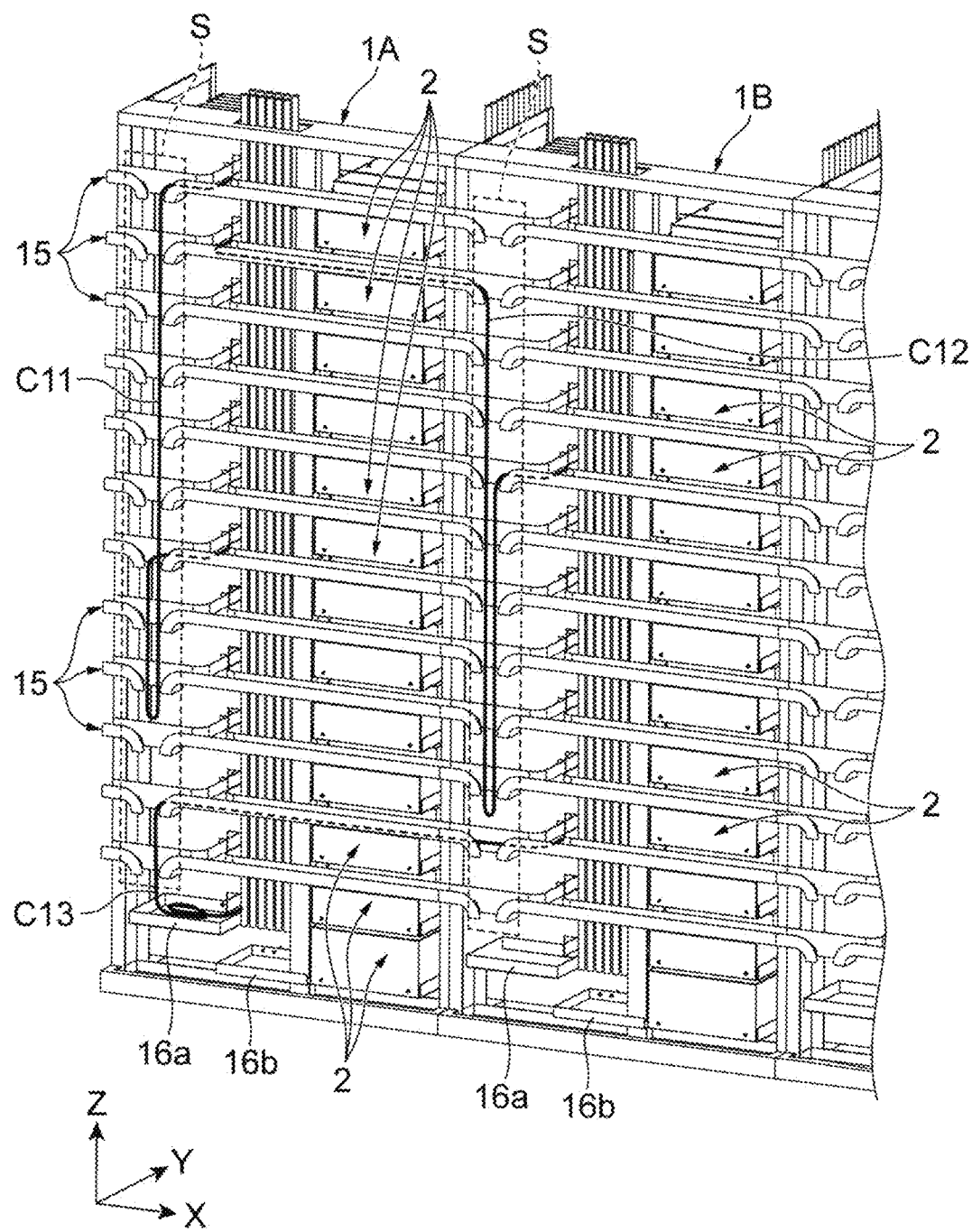
FIG. 12 is a diagram illustrating an example in which a cross-connect optical fiber is laid.

FIG. 12 is a diagram illustrating an example in which the cross-connect optical fibers are laid. In the optical fiber rack 1 illustrated in FIG. 12, the rack positioned at the extreme end in the direction X is an optical fiber rack 1A and the rack adjacent to the optical fiber rack 1A is an optical fiber rack 1B. FIG. 12 illustrates the cross-connect optical fibers C11 to C13 laid on the rail 15. The cross-connect optical fiber C11 optically connects the different termination units 2 of the optical fiber rack 1A to each other. Specifically, the cross-connect optical fiber C11 optically connects the second external connection portion 6 of the termination unit 2 positioned at the uppermost position in the optical fiber rack 1A, and the second external connection portion 6 of the termination unit 2 positioned at the seventh position from the top in the optical fiber rack 1A. In the housing part S of the optical fiber rack 1A, an extra length wiring part of the cross-connect optical fiber C11 is formed. Further, the cross-connect optical fibers C12 and C13 optically connect the termination unit 2 located on the optical fiber rack 1A, and the termination unit 2 located on the optical fiber rack 1B. Specifically, the cross-connect optical fiber C12 optically connects the second termination unit 2 from the top in the optical fiber rack 1A, and the fifth termination unit 2 from the top in the optical fiber rack 1B. On the other hand, the cross-connect optical fiber C13 optically connects the second termination unit 2 from the bottom in the optical fiber rack 1A, and the fourth termination unit 2 from the bottom in the optical fiber rack 1B. In the housing part S of the optical fiber rack 1B, an extra length wiring part of the cross-connect optical fiber C12 is formed. Further, on the tray 16a of the optical fiber rack 1A, an extra length wiring part of the cross-connect optical fiber C13 is located.

Figure 13:
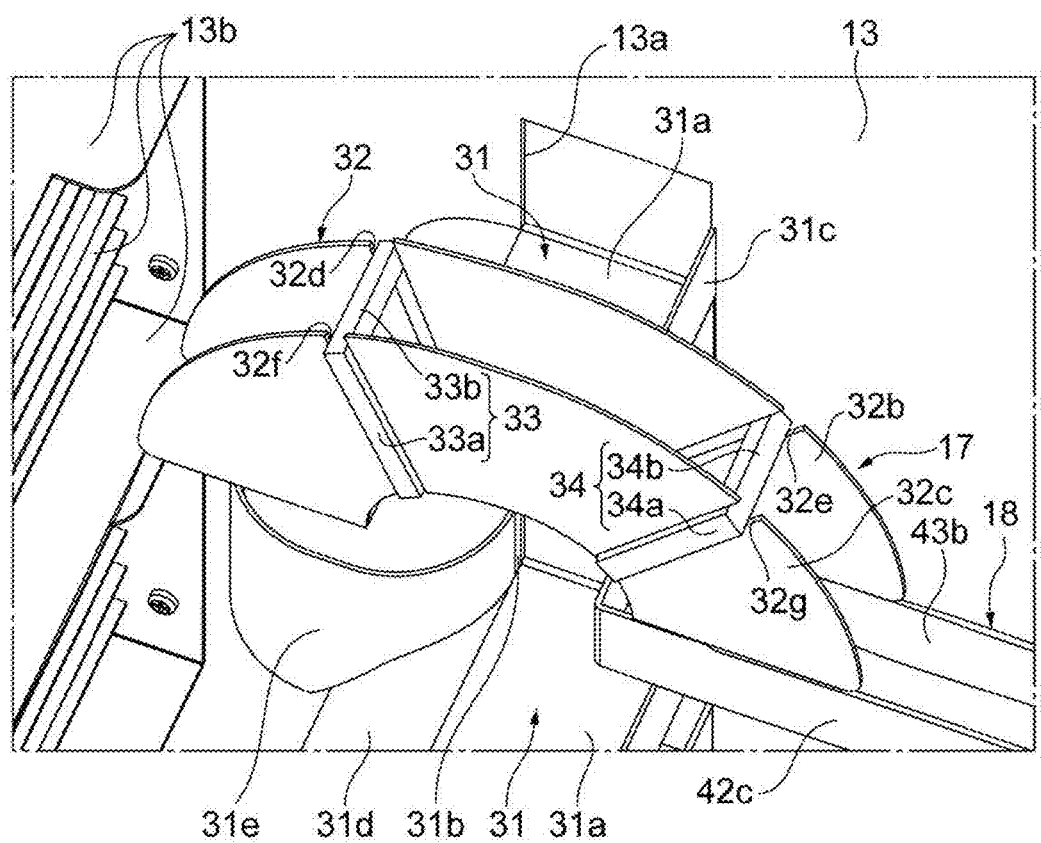
FIG. 13 is an enlarged perspective view of an optical fiber guide.
Figure 14:
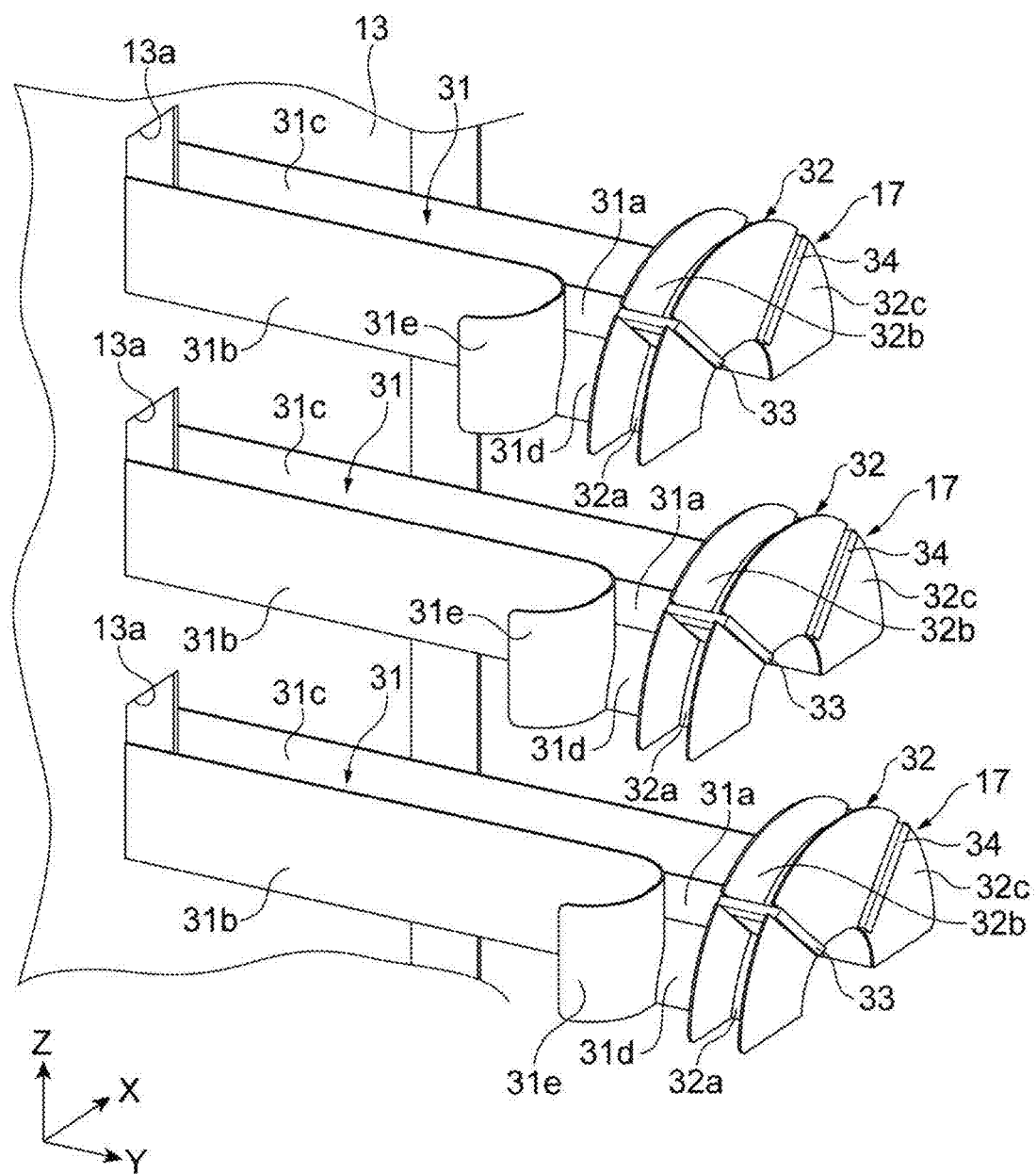
FIG. 14 is an enlarged view of a main part of the optical fiber guide.

Returning to FIG. 1 to FIG. 4, the plurality of optical fiber guides 17 are members guiding the optical fiber connected to the second external connection portion 6 of the termination unit 2 to the optical fiber housing part 12, and are attached to the surface of the partition plate 13 between the support part 13b and the optical fiber housing part 12. The optical fiber guides 17 are arranged in the direction Z to correspond to the termination units 2. Here, configuration of the optical fiber guide 17 will be described with reference to FIG. 13 and FIG. 14. FIG. 13 is an enlarged perspective view of the optical fiber guide 17, and FIG. 14 is a diagram in which a part of the optical fiber guide 17 is extracted. As illustrated in FIG. 13 and FIG. 14, the optical fiber guide 17 includes a guide part 32 (first guide part) housing the optical fiber C3 (for example, optical fiber bundle Wb) directed to the optical fiber housing part 12, a guide part 31 (second guide part) housing optical fiber (for example, cross-connect optical fiber which is the second optical fiber) passing through the opening 13a of the partition plate 13, and a restriction part 33 restricting motion of the optical fiber C3 in the direction Z.

The guide part 31 is a part to be attached to the surface of the partition plate 13. More specifically, the guide part 31 is a part attached to the surface of the partition plate 13 near the corresponding opening 13a. The guide part 31 has a substantially U-shaped groove shape extending in the direction Y. The guide part 31 has a bottom part 31a, a sidewall part 31b positioned on the side of the rack part 11, and a sidewall part 31c positioned on the side of the optical fiber housing part 12. At least a part of the sidewall part 31b of the guide part 31 is cut out. Further, a slope part 31d extending toward the side of the rack part 11 in the direction X is provided from the bottom part 31a where the sidewall part 31b is not provided in the guide part 31. The slope part 31d is curved downward in the direction X from the bottom part 31a toward the rack part 11. A curved plate 31e restricting the position of the optical fiber is provided at the front end part of the sidewall part 31b. The curved plate 31e is curved to guide the second optical fiber to the guide part 31. The curved plate 31e is a plate-like member curved toward the front side as viewed from the direction Z. A curvature radius of the curved plate 31e viewed from the direction Z is larger than the allowable bending radius of the optical fiber guided by the guide part 31, for example. In this case, a part of the optical fiber in contact with the curved plate 31e can be prevented from bending to exceed the allowable bending radius to be broken.

The length of each guide part 31 in the direction Y is not uniform but vary. Specifically, as the optical fiber guide 17 provided further downward in the direction Z, a dimension of the guide part 31 in the direction Y is longer. For example, the dimension in the direction Y of each guide part 31 is adjusted so that the guide parts 32 do not overlap each other in the direction Z.

The guide part 32 is a part provided at the leading end of the guide part 31 in the direction Y, and has a substantially U-shaped groove shape extending to cross the guide part 31. The guide part 32 has a bottom part 32a, a sidewall part 32b (wall part) positioned on the side of the guide part 31, and a sidewall part 32c positioned on the opposite side of the sidewall part 32b via the bottom part 32a. The bottom part 32a is curved upward as viewed from the direction Y. A curvature radius of the bottom part 32a viewed from the direction Y is larger than the allowable bending radius of the optical fiber in the optical fiber bundle Wb, for example. The sidewall part 32b is provided to partition between the guide part 31 and the guide part 32. Specifically, the sidewall part 32b is provided to partition not only between the bottom parts 31a and 32a, but also between the slope part 31d and the bottom part 32a. The sidewall parts 32b and 32c are provided along the shape of the bottom part 32a, and have substantially the same shape. A slit 32d is provided on the side of the rack part 11 of the sidewall part 32b, and a slit 32e is provided on the side of the optical fiber housing part 12 of the sidewall part 32b. Similarly, a slit 32f is provided on the side of the rack part 11 of the sidewall part 32c, and a slit 32g is provided on the side of the optical fiber housing part 12 of the sidewall part 32c. The slits 32d and 32f are provided to face each other in the direction Y, and the slits 32e and 32g are provided to face each other in the direction Y.

Each of the restriction part 33 and the restriction part 34 is a member that restricts motion of the optical fiber bundle Wb housed in the guide part 32 in the direction Z. The restriction part 33 is provided to be housed in the slits 32d and 32f, and has a substantially rectangular frame shape. The restriction part 33 has a main body part 33a having a substantially U shape, and a bar-like member 33b attached to the upper end of the main body part 33a. The main body part 33a is housed in the slits 32d and 32f to be substantially U-shaped as viewed from the direction X. One end of the bar-like member 33b is pivotably attached to one upper end part of the main body part 33a, and the other end of the bar-like member 33b is caught together the other upper end part of the main body part 33a. For example, the other end of the bar-like member 33b is inserted into a groove provided in the other upper end part of the main body part 33a, thereby the restriction part 33 constitutes a frame shape. the restriction part 33 may have a means (for example, claw part or the like) to be fixed to the guide part 32. The restriction part 34 has the same function and shape as the restriction part 33, and is housed in the slits 32e and 32g. Therefore, the restriction part 34 has a main body part 34a having a substantially U shape, and a bar-like member 34b attached to the upper end of the main body part 34a. The motion of the optical fiber bundle Wb in the direction Z is restricted so that the optical fiber bundle Wb is laid in the direction X and the direction Y, and as a result, the motion of the optical fiber bundle Wb in the direction along the guide part 32 is restricted.

Here, an example of a method of using the restriction part 33 will be described. First, the main body part 33a of the restriction part 33 is housed in the slits 32d and 32f. Next, the optical fiber bundle Wb is housed on the bottom part of the main body part 33a. At this time, by releasing the catching state of the other end of the bar-like member 33b to the main body part 33a, the optical fiber bundle Wb can be easily housed in the main body part 33a. Next, the bar-like member 33b is caught together the main body part 33a. Thereby, the optical fiber bundle Wb is housed in the space defined by the restriction part 33, and motion of the optical fiber bundle Wb in the direction Z can be restricted. The restriction part 34 may be used in the same manner as the restriction part 33.

The number of restriction parts may be one, but there may be at least two restriction parts. In a case of adding the optical fiber to the optical fiber bundle Wb or decreasing the optical fiber from the optical fiber bundle Wb, the optical fiber bundle Wb may be held to prevent unexpected stress thereon by moving the optical fiber bundle Wb already housed by its own weight when releasing the restriction part. In such a case, if there are at least two restriction parts, even if one restriction part is released unless the other is released, the optical fiber bundle Wb can be continuously held. For example, in the case where there are two restriction parts, after one restriction part is uncoupled to release a part of the optical fiber from one restriction part, the one restriction part is caught together to hold the optical fiber bundle Wb, and then, the other restriction part is uncoupled to release the part of the optical fiber from the other restriction part, so that the part of the optical fiber can be separated from the optical fiber bundle Wb. On the other hand, the optical fiber bundle Wb except for the optical fiber to be separated continuously keeps a state of being caught together to prevent an unexpected stress from applying. When adding the optical fiber, in a reverse procedure to the above, after one restriction part is uncoupled to catch together the optical fiber bundle Wb including the optical fiber to be added by one restriction part, the other restriction part may be released from the catching state to catch together the optical fiber bundle Wb including the optical fiber to be added by the other restriction part.

Figure 15:
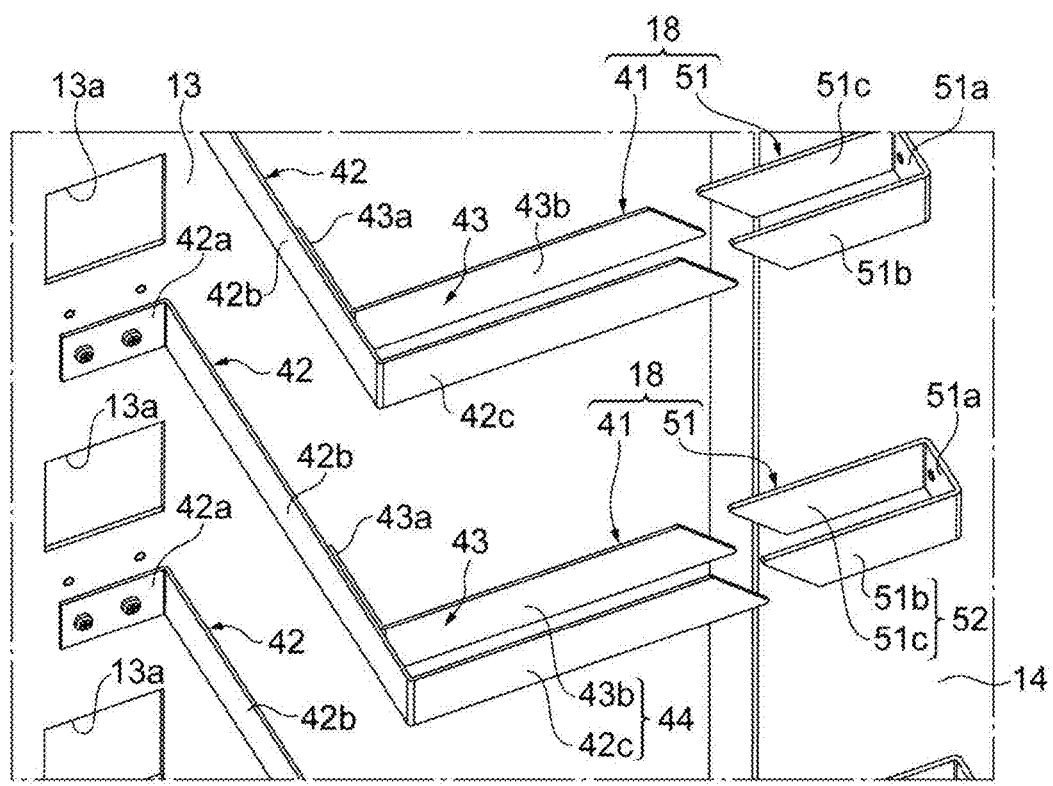
FIG. 15 is an enlarged view of a main part of a first dividing member.
Figure 15:
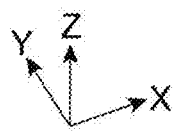
Figure 16:
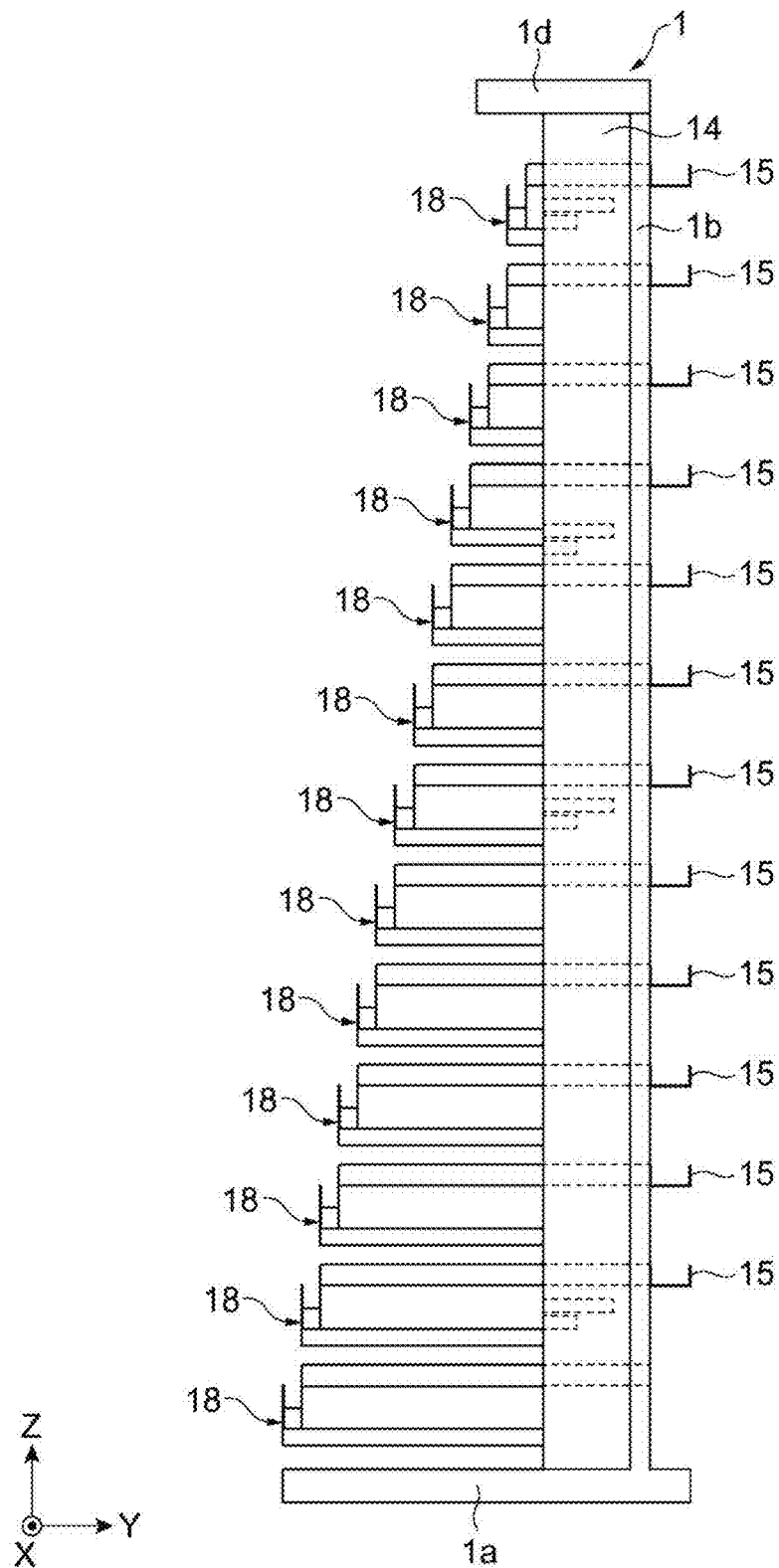
FIG. 16 is a schematic diagram of the optical fiber housing part as viewed in a direction X from a lateral plate side.

FIG. 15 is a diagram in which a part of the first dividing member is extracted. FIG. 16 is a schematic diagram of the optical fiber housing part 12 as viewed in the direction Y from the lateral plate 14 side. As also illustrated in FIG. 11, each of the first dividing members 18 illustrated in FIG. 15 and FIG. 16 is a member dividing positions of the optical fiber bundle Wb in the optical fiber housing part 12. The plurality of first dividing members 18 are arranged side by side with the corresponding optical fiber guides 17 in the direction Z in the optical fiber housing part 12, respectively. As illustrated in FIG. 16, as the first dividing member 18 is provided more downward in the direction Z, the first dividing member 18 is positioned more forward in the direction Y in common with the optical fiber guide 17. Each of the first dividing members 18 has a first dividing body 41 attached to the surface of the partition plate 13, and a second dividing body 51 attached to the lateral plate 14.

The first dividing body 41 is a member for dividing a part introduced into the optical fiber housing part 12 from the optical fiber guide 17, the part being in the optical fiber bundle Wb housed in the optical fiber housing part 12. The first dividing body 41 is composed of a first bar-like member 42 and a second bar-like member 43, for example. The first bar-like member 42 includes a flange part 42a fastened to the surface of the partition plate 13 via a fastening member such as screw, a middle part 42b extending in the direction Y from an end of the flange part 42a on the side of the lateral plate 14 in the direction X, and a dividing part 42c (one first dividing bar) crossing the direction Y from a forward end of the middle part 42b and extending toward the lateral plate 14. The flange part 42a, the middle part 42b, and the dividing part 42c are provided by bending a member having a bar-like shape, for example. The flange part 42a is fastened below the corresponding optical fiber guide 17. As the middle part 42b provided more downward in the direction Z, a dimension in the direction Y is longer. In the embodiment, the dividing part 42c extends in the direction X.

The second bar-like member 43 includes a flange part 43a joined to the middle part 42b, and a dividing part 43b (the other first dividing bar) extending from an end of the flange part 43a on the side of the dividing part 42c in a direction crossing the direction Y. The flange part 43a and the dividing part 43b are provided by bending a member having a bar-like shape, for example. The flange part 43a is joined to a surface of the middle part 42b facing the lateral plate 14 with an adhesive or the like, for example. The dividing part 43b is positioned closer to the side of the partition plate 13 than the dividing part 42c in the direction Y, and is apart from the dividing part 42c in the direction Y.

The first dividing body 41 is continuously connected to the tip part of the guide part 32 of the corresponding optical fiber guide 17, the tip part being located on the side of the optical fiber housing part 12. More specifically, as illustrated in FIG. 13, the dividing part 42c is continuously connected to the tip part of the sidewall part 32c on the side of the optical fiber housing part 12, and the dividing part 43b is continuously connected to the tip part of the sidewall part 32b on the side of the optical fiber housing part 12. Accordingly, the optical fiber bundle Wb guided by the guide part 32 is easily divided by the first dividing body 41 in the optical fiber housing part 12 because the guide part 32 and the dividing parts 42c and 43b are formed in one body.

The second dividing body 51 is a member for dividing the optical fiber bundle Wb to be housed in the optical fiber housing part 12 and provided to be opposite to and apart from the first dividing body 41 in the direction X. The second dividing body 51 is provided by bending a member having a bar-like shape into a substantially U shape, for example. The second dividing body 51 includes a base part 51a joined to the lateral plate 14, a dividing part 51b (one second dividing bar) extending from one end of the base part 51a in the direction Y toward the first dividing body 41, and a dividing part 51c (the other second dividing bar) extending from the other end of the base part 51a in the direction Y toward the first dividing body 41. The base part 51a is fixed to the lateral plate 14 via a screw or the like, for example. The fixing position of the base part 51a is adjusted depending on the position of the corresponding first dividing body 41 in the direction Y.

The dividing parts 51b and 51c are bar-like parts provided apart from each other in the direction Y. The dividing part 51b is positioned forward of the dividing part 51c in the direction Y. In the direction X, the dividing part 51b is provided to be opposite to and apart from the dividing part 42c of the first bar-like member 42. In addition, the dividing part 51c is provided to be opposite to and apart from the dividing part 43b of the second bar-like member 43 in the direction X. The dividing part 51b may be provided on an extended line of the dividing part 42c, and the dividing part 51c may be provided on an extended line of the dividing part 43b.

The second dividing member 19 is a member for dividing a part of each of the plurality of optical fiber bundles Wb, the part extending outward from the optical fiber housing part 12. The second dividing member 19 is composed of a plurality of plate-like fragments arranged in the direction Y to be apart from each other. The second dividing member 19 is provided near the upper end of the lateral plate 14.

The effect obtained by the optical fiber rack 1 according to the present embodiment described above will be described. The termination unit 2 according to the embodiment includes the fixing member 71 to which the multi fiber cable MC1 is fixed, and the fixing member 71 is attached to the side surface 3a of the housing 3 to be movable along the slit part 61 which is a guide part extending in the direction Y. Therefore, the multi fiber cable MC1 fusion spliced to the plurality of first optical fibers 7 is movable in the direction Y in conjunction with the fixing member 71. In this case, even after the termination unit 2 is located on the rack part 11, the fixing member 71 in the rack part 11, and the position of the multi fiber cable MC1 with the fixing member 71 can be adjusted. Therefore, since it is possible to perform the construction work of the optical fiber rack 1 without observing the position and order in which the respective termination units 2 are located on the rack part 11, it is possible to facilitate and simplify the construction work of the optical fiber rack 1.

The fixing member 71 includes the main part 74 attached to the housing 3, and the fixing part 75 protruding from the main part 74 and to which the multi fiber cable MC1 is fixed. Therefore, the multi fiber cable MC1 can be easily and stably fixed to the fixing part 75 by using the binding member 84 or the like, for example.

The fixing member 71 is pivotably attached to the side surface 3a, and the termination unit 2 includes the male screw 83 functioning as a holding member determining the position of the fixing member 71 in the direction Y and the orientation of the fixing member 71. Therefore, in each case of when the termination unit 2 is located on the rack part 11, and when the termination unit 2 is not located on the rack part 11, the position and orientation of the multi fiber cable MC1 can be held in an appropriate state. For example, in a state in which the termination unit 2 in which the multi fiber cable MC1 has been introduced in advance is not located on the rack part 11, the fixing member 71 is positioned on the rear side of the housing 3 and held in the first orientation state. In this case, a part fixed to the fixing member 71 and its peripheral part of the multi fiber cable MC1 can be extended along the side surface 3a of the housing 3. As a result, in order to package the termination unit 2 in a compact manner, when attempting to wind the multi fiber cable MC1 around the housing 3, it is possible to suppress the concentration of the load on the fixing member 71 and its peripheral part of the multi fiber cable MC1. Therefore, breakage of the multi fiber cable MC1 packed is suppressed. Further, after locating the termination unit 2 on the rack part 11, by determining the position of the fixing member 71 and holding it in the second orientation state, it is possible to construct the optical fiber rack without worrying about the position and order in which the respective termination units 2 are located on the rack part 11.

The termination unit 2 includes a cover 64 housing the second optical fiber C1 attached to the side surface 3a of the housing 3 and exposed from the multi fiber cable MC1 from the housing 3. For this reason, it is possible to prevent the second optical fiber C1 exposed from the housing 3 from being exposed from the termination unit 2, so that breakage or the like of the second optical fiber C1 can be suppressed. In the above example, the second optical fiber C1 exposed from the multi fiber cable MC1 is covered with a tube around the second optical fiber C1, but protective capability of the tube protecting the second optical fiber C1 against external force is not necessarily sufficient, so that it becomes possible to further strongly protect by the cover 64.

The optical fiber rack according to the present disclosure is not limited to the above-described embodiment, and various other modifications are possible. For example, in the above embodiment, the termination unit 2 positioned at a lowermost position in the rack part 11 is optically connected to the optical fiber C2 housed in the local fusion cable MC2, but the present disclosure is not limited thereto. As a specific example, a termination unit other than the termination unit positioned at the lowermost position may be optically connected to the optical fiber C2 housed in the local fusion cable MC2, or all the termination units 2 may be optically connected to the second optical fiber C1 housed in the corresponding multi fiber cable MC1.

In the above embodiment, the fixing member 71 includes the first plate 72, but the present disclosure is not limited thereto. The fixing member may include only the second plate 73. In this case, the number of parts of the fixing member can be reduced. Further, each of the first plate 72 and the second plate 73 is provided with an opening through which at least two or more male screws 83 are inserted, but the present disclosure is not limited thereto. For example, the first plate 72 may be provided with one opening inserting the male screw 83 in the first orientation state, and one opening inserting the male screw 83 in the second orientation state, and the second plate 73 may be provided with one opening through which the male screw 83 is inserted. In this case, the row along the slit part 61 formed by the second screw hole 63 may be arranged in one row.

In the above embodiment, when the fixing member 71 is not fastened by the male screw 83, the pivot of the second plate 73 is restricted by the fastening member 82 and the opening 74b, but the present disclosure is not limited thereto. For example, the opening 74b may not be provided in the second plate 73, and the fastening member 82 may not be used. In this case, when the fixing member 71 is not fastened by the male screw 83, the second plate 73 becomes pivotable about the fastening member 81 as an axis. In the case where the fixing member includes only the second plate 73 as described above, the fixing member itself becomes pivotable about the fastening member 81 as an axis.

In the above embodiment, the multi fiber cable MC1 is fixed to the fixing part 75 protruding from the main part 74 in the fixing member 71, but the present disclosure is not limited thereto. For example, the second plate 73 may have a flat plate shape, and the multi fiber cable MC1 may be fixed to the second plate 73. In this case, the second plate 73 may be provided with an opening through which the binding member passes, or the binding member may be formed into one body.

In the above embodiment, the position and orientation of the fixing member 71 are held by the male screw 83, but the present disclosure is not limited thereto. In other words, the holding member holding the position and orientation of the fixing member 71 is not limited to the male screw 83, and other known members may be used.

In the above embodiment, the slit part 61 is provided in the housing 3 as a guide part guiding movement of the fixing member 71, but the present disclosure is not limited to this. For example, a rail or the like guiding movement of the fixing member may be provided as the guide part. In this case, the fastening members 81, 82 and the like may be known members other than bolt nuts.

In the above embodiment, the optical fiber guide 17 is provided with the curved plate 31e, but the present disclosure is not limited thereto. For example, the curved plate 31e may be attached to the surface of the partition plate 13. Further, the curved plate 31e is not necessarily provided. For example, a part of the optical fiber guides 17 may not have the curved plate 31e.

In the above embodiment, the number of the optical fiber guides 17 and the number of the first dividing members 18 may be the same as each other or may be different from each other. For example, the number of the optical fiber guides 17 is the same as the number of the termination units 2, and the number of the first dividing members 18 may be smaller than a number of the termination units 2.

In the above embodiment, the restriction parts 33 and 34 are provided, but the present disclosure is not limited thereto. For example, only either one of the restriction parts 33 or 34 may be provided. Alternatively, the optical fiber guide may be provided with the restriction part other than the restriction parts 33 and 34. Further, the shape of the restriction parts 33 and 34 is not particularly limited. For example, the restriction part may be a part of the sidewall parts 32b and 32c of the guide part 32.

What is claimed is:

1. A termination unit to be located on a rack part of an optical fiber rack, the termination unit comprising:
a housing;
a plurality of first optical fibers located in the housing and fusion spliced to a multi fiber cable introduced from an outside of the optical fiber rack;
a plurality of external connection adapters located in a line in a first direction, the plurality of first optical fibers being respectively connected to the plurality of external connection adapters on an inside of the housing;
a guide part located on one side surface of the housing and extending in a second direction crossing the first direction, the one side surface extending to cross the first direction; and
a fixing member attached to the one side surface of the housing, the multi fiber cable being fixed to the fixing member,
wherein the fixing member is movably attached along the guide part.

2. The termination unit according to claim 1,
wherein the fixing member comprises a main part attached to the housing, and a fixing part protruding from the main part, and
wherein the multi fiber cable is fixed to the fixing part.

3. The termination unit according to claim 1,
wherein the fixing member is pivotably attached to the one side surface, and
further comprises a holding member determining a position of the fixing member in the second direction, and an orientation of the fixing member.

4. The termination unit according to claim 3,
wherein the fixing member comprises a main part attached to the housing, and
wherein the fixing member is pivotably attached along an opening in the main part, the opening having a substantially circular arc shape.

5. The termination unit according to claim 1, further comprising a cover configured to house a second optical fiber exposed from the multi fiber cable, the second optical fiber being exposed from the housing,
wherein the cover is attached to the one side surface of the housing.

6. The termination unit according to claim 1,
wherein the guide part is a slit in the one side surface of the housing.

7. The termination unit according to claim 6,
wherein the fixing member is attached to the housing through the slit and is configured to move along the slit.

* * * * *